United States Patent
Truebenbach et al.

(10) Patent No.: US 11,358,282 B2
(45) Date of Patent: Jun. 14, 2022

(54) SYSTEM AND METHOD FOR CONSTRAINT MANAGEMENT OF ONE OR MORE ROBOTS

(71) Applicant: Teradyne, Inc., North Reading, MA (US)

(72) Inventors: Eric Lenhart Truebenbach, Sudbury, MA (US); Evgeny Polyakov, Brookline, MA (US); Peter Lustig, North Reading, MA (US)

(73) Assignee: Teradyne, Inc., North Reading, MA (US)

( * ) Notice: Subject to any disclaimer, the term of this patent is extended or adjusted under 35 U.S.C. 154(b) by 194 days.

(21) Appl. No.: 16/378,343

(22) Filed: Apr. 8, 2019

(65) Prior Publication Data

US 2020/0316779 A1    Oct. 8, 2020

(51) Int. Cl.
*B25J 9/16* (2006.01)
(52) U.S. Cl.
CPC ......... *B25J 9/1692* (2013.01); *B25J 9/1607* (2013.01); *B25J 9/1671* (2013.01)
(58) Field of Classification Search
CPC ...... B25J 9/1692; B25J 9/1607; B25J 9/1671; B25J 9/1612; B25J 9/1643; G05B 2219/40336
See application file for complete search history.

(56) References Cited

U.S. PATENT DOCUMENTS

| | | | |
|---|---|---|---|
| 9,339,934 B2 * | 5/2016 | Kogan | B25J 9/1656 |
| 9,895,803 B1 | 2/2018 | Oslund | |
| 2015/0081098 A1 * | 3/2015 | Kogan | B25J 9/1656 700/258 |
| 2017/0274533 A1 * | 9/2017 | Berghofer | B25J 9/1689 |
| 2017/0336776 A1 | 11/2017 | Watanabe et al. | |
| 2017/0364076 A1 | 12/2017 | Keshmiri et al. | |
| 2018/0036883 A1 * | 2/2018 | Nishitani | B25J 9/1671 |
| 2018/0354130 A1 * | 12/2018 | Preisinger | G05B 19/427 |
| 2018/0370030 A1 | 12/2018 | Sedlmayr | |
| 2019/0086907 A1 | 3/2019 | Oestergaard et al. | |
| 2019/0240833 A1 * | 8/2019 | Kimura | B25J 9/0081 |

OTHER PUBLICATIONS

International Search Report and Written Opinion in PCT Application No. PCT/US2020/027049 dated Jul. 20, 2020; 9 pages.

* cited by examiner

*Primary Examiner* — Jason Holloway
(74) *Attorney, Agent, or Firm* — Mark H. Whittenberger, Esq.; Holland and Knight LLP

(57) ABSTRACT

Embodiments of the present disclosure are directed towards a robotic system. The system may include a robot configured to receive an initial constrained approach for performing a robot task. The system may further include a graphical user interface in communication with the robot. The graphical user interface may be configured to allow a user to interact with the robot to determine an allowable range of robot poses associated with the robot task. The allowable range of robot poses may include fewer constraints than the initial constrained approach. The allowable range of poses may be based upon, at least in part, one or more degrees of symmetry associated with a workpiece associated with the robot task or an end effector associated with the robot. The system may also include a processor configured to communicate the allowable range of robot poses to the robot.

22 Claims, 43 Drawing Sheets

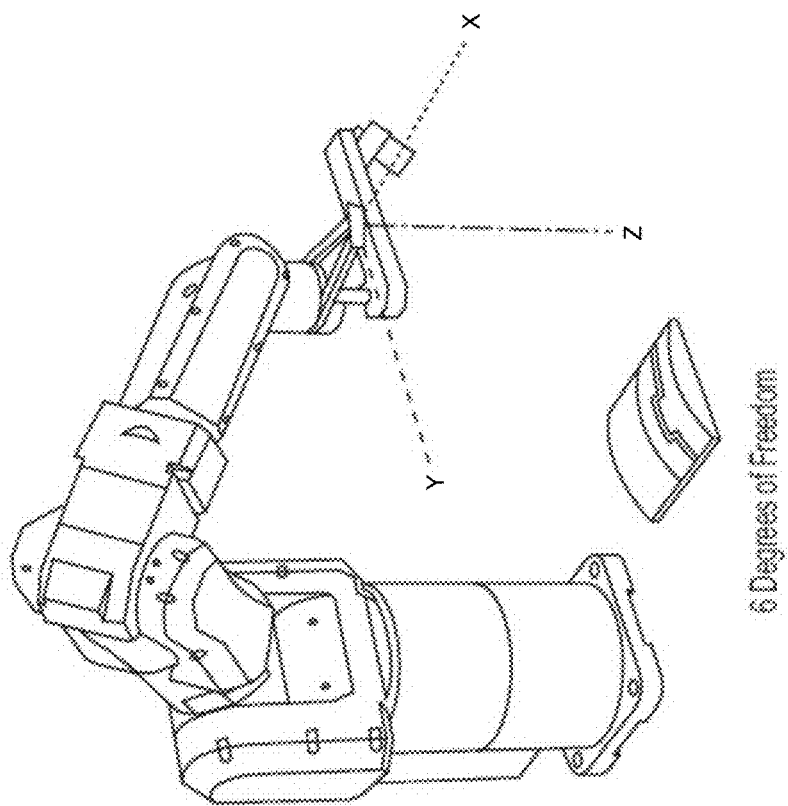
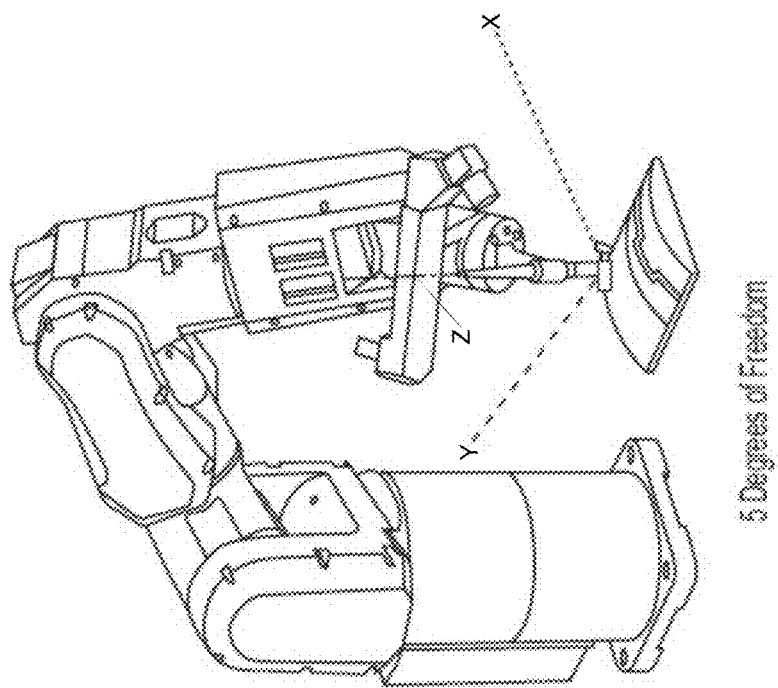
FIG. 2

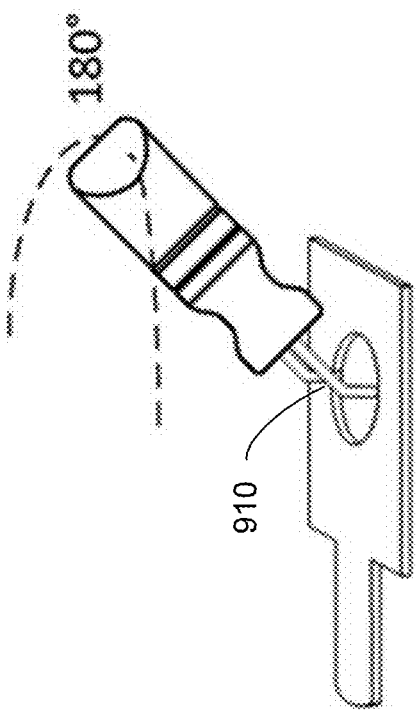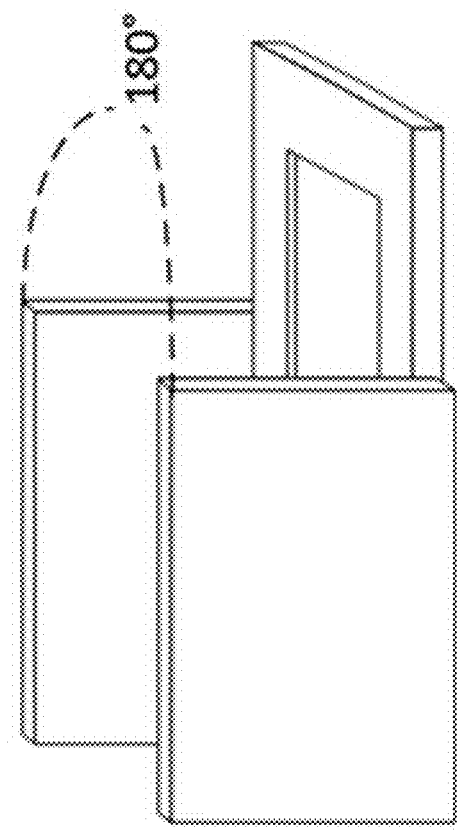
FIG. 9

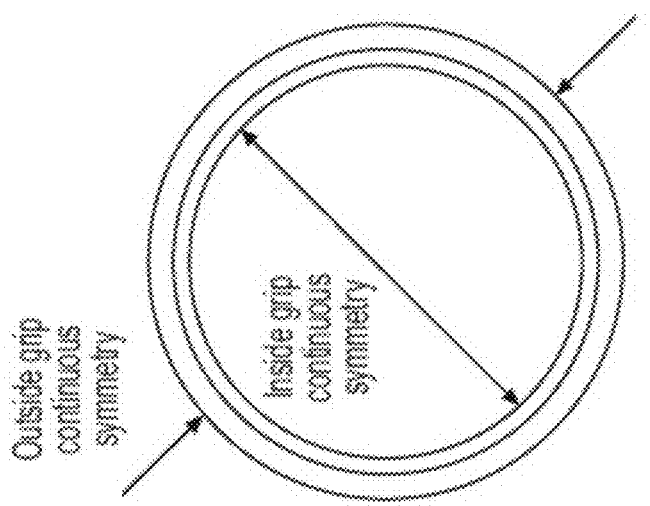
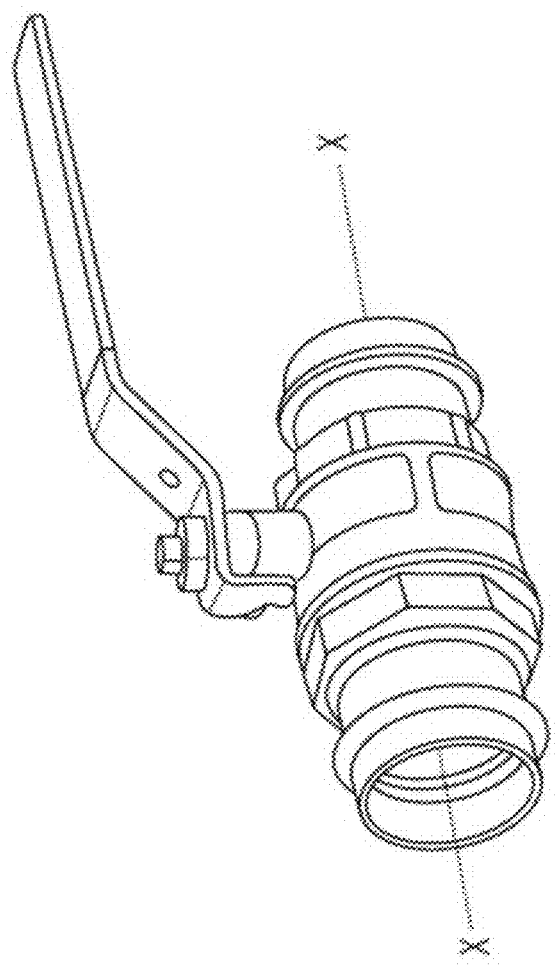
FIG. 24

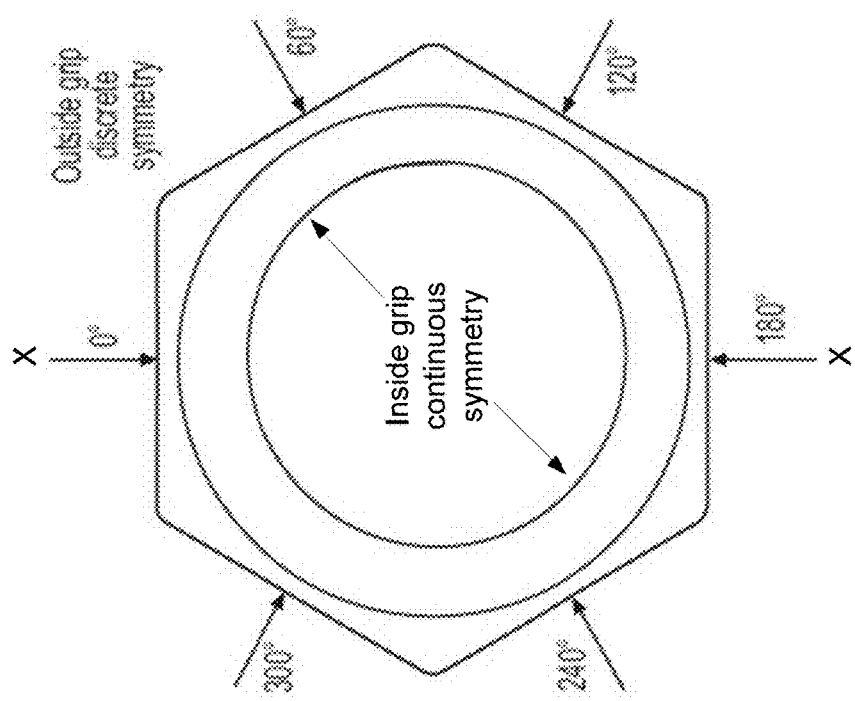
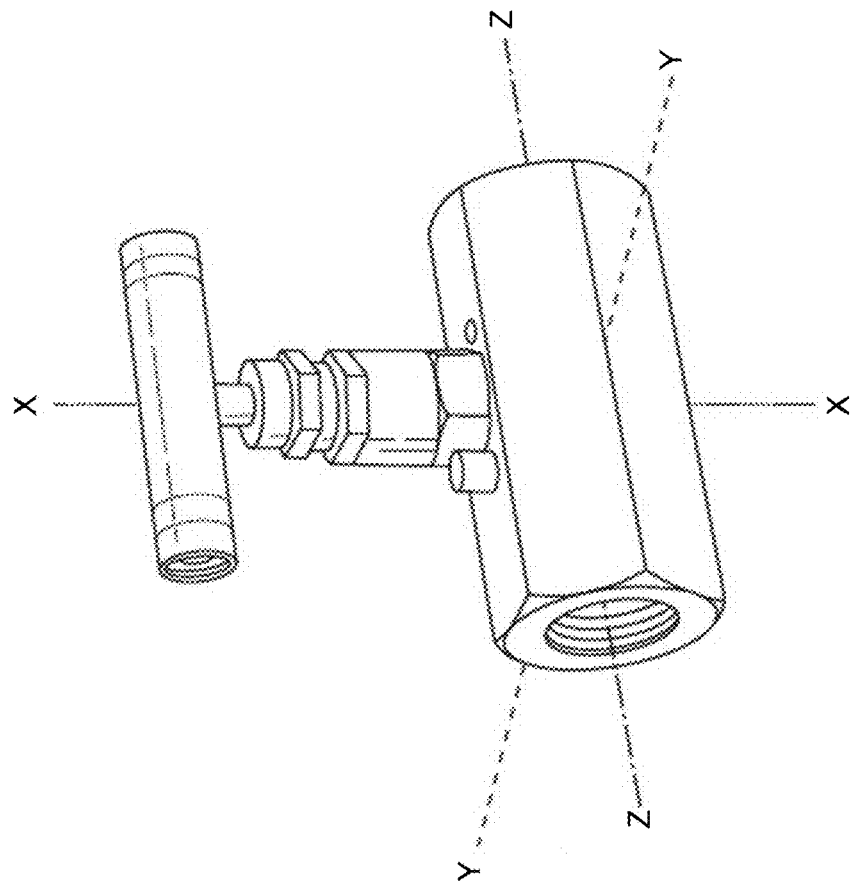
FIG. 26

2800

| Pick feature \ End effector | Asymmetrical | Continuous Symmetry | Discrete Symmetry |
|---|---|---|---|
| Asymmetrical | Fully constrained: Only use the taught pick | Free spin in part pick feature z | Discrete spin in part pick feature z |
| Continuous symmetry | Free spin in end effector's z | Free spin in either end effector or part pick feature z | Free spin in end effector z |
| Discrete symmetry | Discrete spin in end effector z, relative to end effector zero angle | Free spin in part pick feature z, relative to pick feature zero angle | Discrete spin in lesser of two angles, with aligned zero angles |

| Place feature →<br>↓ Place target | Asymmetrical | Continuous symmetry | Discrete symmetry |
|---|---|---|---|
| Asymmetrical | Fully constrained: Only use the taught place | Free spin in part place feature z | Discrete spin in part place feature z |
| Continuous symmetry | Free spin in place target's z | Free spin in either place target or part place feature z | Free spin in place target z |
| Discrete symmetry | Discrete spin in place target z, relative to place target zero angle | Free spin in part place feature z, relative to place feature zero angle | Discrete spin in lesser of two angles, with aligned zero angles |

FIG. 34

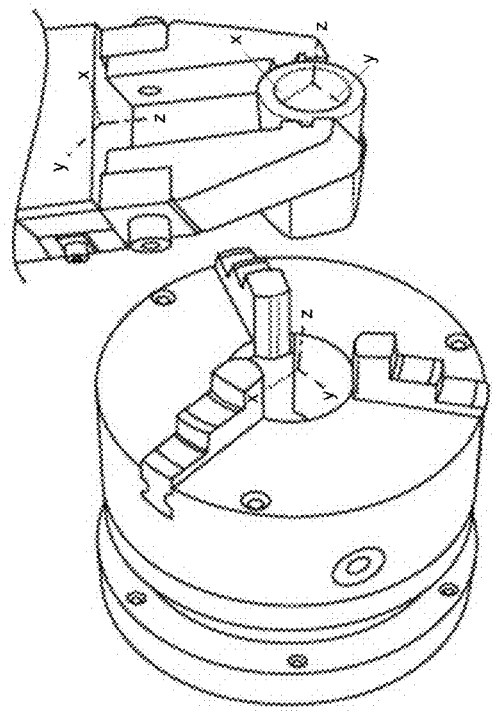

| Element | Symmetry | Ref axis | Zero ref |
|---|---|---|---|
| Pick feature | Continuous | Z | |
| End effector | 180° discrete | Z | X |
| Workpiece place feature | 60° discrete | Z | X |
| Place target place feature | 120° discrete | Z | X |

Pick: Since the workpiece pick feature is less constrained than the end effector, use free spin in pick feature z.

Place: The lesser of the two discrete symmetries is 60° for the workpiece, the place can be in any 60° increment. Note the workpiece and place target zero reference axes are aligned.

FIG. 36

SYSTEM AND METHOD FOR CONSTRAINT MANAGEMENT OF ONE OR MORE ROBOTS

FIELD OF THE INVENTION

The invention generally relates to robotics and more specifically to a system and method for under-constraining a robot or robotic system.

BACKGROUND

Tasking a robot is difficult, and this difficulty is exacerbated by tasking robots in an unnatural, over constrained way. Natural tasking is a comprehensive approach to specifying robotic tasks easily without over- or under-constraint.

A gymnast, for example, does not model the exact position of hand placements on bars, but rather models the bars as having one degree of freedom in placement. Similarly, tasks like welding and painting have an extra degree of freedom in how the electrode or nozzle is rotated about its primary axes, and the operator tasking a robot benefits by working with these natural constraints. Similarly, a workpiece to be grasped by an industrial robot may have symmetry that allows grasping in multiple ways. Natural tasking specifies the constraint on the robot in its minimal and least restrictive, way.

SUMMARY

In one or more embodiments of the present disclosure, a system is provided. The system may include a robot configured to receive an initial constrained approach for performing a robot task. The system may further include a graphical user interface in communication with the robot. The graphical user interface may be configured to allow a user to interact with the robot to determine an allowable range of robot poses associated with the robot task. The allowable range of robot poses may include fewer constraints than the initial constrained approach. The allowable range of poses may be based upon, at least in part, one or more degrees of symmetry associated with a workpiece associated with the robot task or an end effector associated with the robot. The system may also include a processor configured to communicate the allowable range of robot poses to the robot.

One or more of the following features may be included. The initial constrained approach for performing the robot task may be received from at least one of a user input, a program, a simulation, or a user demonstration. The one or more degrees of symmetry may include a degree of symmetry of a pick feature of a workpiece associated with the robot task. The degree of symmetry of the pick feature of the workpiece may be continuous, discrete, or asymmetrical. The one or more degrees of symmetry may include a degree of symmetry of a robot end effector. The degree of symmetry of the robot end effector may be continuous, discrete, or asymmetrical. The one or more degrees of symmetry may include a degree of symmetry of the placement target associated with the robot task. The degree of symmetry of the placement target may be continuous, discrete, or asymmetrical. The processor may be further configured to determine a first valid pose for a workpiece relative to a robot end effector associated with the robot. The processor may be further configured to identify an axis of a coordinate frame associated with the workpiece that is coincident with an axis of the robot end effector's coordinate frame when the workpiece is in the first valid pose. The processor may be further configured to determine a range of valid robot end effector poses by allowing rotation of the robot end effector based upon, at least in part, a degree of symmetry determined for either the workpiece around the axis of the workpiece's coordinate frame or for the robot end effector around the axis of the robot end effector's coordinate frame. The graphical user interface may be configured to display the robot end effector, a workpiece, and at least one of an axis of a coordinate frame associated with the robot end effector or an axis of a coordinate frame associated with the workpiece and wherein the graphical user interface is configured to allow a user to specify whether the robot end effector has substantially equivalent performance for picking up a workpiece when the robot end effector is rotated around one of the axis of the coordinate frame associated with the robot end effector or the axis of the coordinate frame associated with the workpiece. The processor may be further configured to determine a placement for a workpiece relative to a placement target associated with the robotic system. The processor may be further configured to determine a range of valid robot end effector poses by allowing rotation of the robot end effector based upon, at least in part, a degree of symmetry determined for either the workpiece around the axis of the workpiece's coordinate frame or for the placement target. The graphical user interface may be configured to display the robot end effector, a workpiece, and at least one of an axis of a coordinate frame associated with the robot end effector or an axis of a coordinate frame associated with the workpiece and wherein the graphical user interface is configured to allow a user to specify whether the robot end effector has substantially equivalent performance for placing the workpiece at the placement target when the robot end effector is rotated around the axis of the coordinate frame associated with the robot end effector or the axis of the coordinate frame associated with the workpiece. The processor may be further configured to determine a minimum number of degrees of freedom (DOFs) required for the robot to perform the task associated with the range of poses. The processor may be further configured to determine an additional number of degrees of freedom required satisfy one or more additional constraints. The processor may be further configured to combine the minimum number of degrees of freedom with the additional number of degrees of freedom to determine a total number of degrees of freedom, wherein the processor may be further configured to compare the total number of degrees of freedom with a maximum number of allowable degrees of freedom associated with the robot. The processor may be further configured to determine a difference between the maximum number of allowable degrees of freedom and the total number of degrees of freedom and to optimize performance of the robot, based upon, at least in part, a range of poses associated with the difference. The allowable range of poses may be based upon, at least in part, one or more degrees of symmetry associated with a placement target associated with the robot task.

In another embodiment of the present disclosure, a method is provided. The method may include providing a robot configured to receive an initial constrained approach for performing a robot task. The method may further include allowing a user to interact with the robot using a graphical user interface in communication with the robot. The graphical user interface may be configured to allow a user to interact with the robot to determine an allowable range of robot poses associated with the robot task. The allowable range of robot poses may include fewer constraints than the initial constrained approach, and the allowable range of poses may be based upon, at least in part, one or more degrees of symmetry associated with at least one of a workpiece associated with the robot task or an end effector associated with the robot. The method may also include communicating, via a processor, the allowable range of robot poses to the robot.

BRIEF DESCRIPTION OF THE DRAWINGS

For a better understanding of the nature and objects of the present disclosure, reference is made to the following detailed description taken in conjunction with the following drawings, in which:

FIG. 2 is a graphical user interface showing multiple degrees of freedom of a natural tasking robotic system, according to an embodiment of the present disclosure;

FIG. 9 shows an example of a workpiece placement target having obstacles located around the target according to embodiments of the present disclosure;

FIG. 24 shows an example of an asymmetrical workpiece according to embodiments of the present disclosure;

FIG. 26 shows an example of a workpiece according to embodiments of the present disclosure;

FIG. 33 shows a table depicting examples of motion constraints according to embodiments of the present disclosure;

FIG. 34 shows a table depicting examples of motion constraints according to embodiments of the present disclosure;

FIG. 36 shows an example of a workpiece being placed at a place target according to embodiments of the present disclosure;

DETAILED DESCRIPTION

Embodiments of the subject application may include concepts from U.S. Pat. Nos. 6,757,587, 7,680,300, 8,301, 421, 8,408,918, 8,428,781, 9,357,708, U.S. Publication No. 2015/0199458, U.S. Publication No. 2016/0321381, and U.S. Publication No. 2018/0060459, the entire contents of each are incorporated herein by reference in their entirety.

Figure 1:
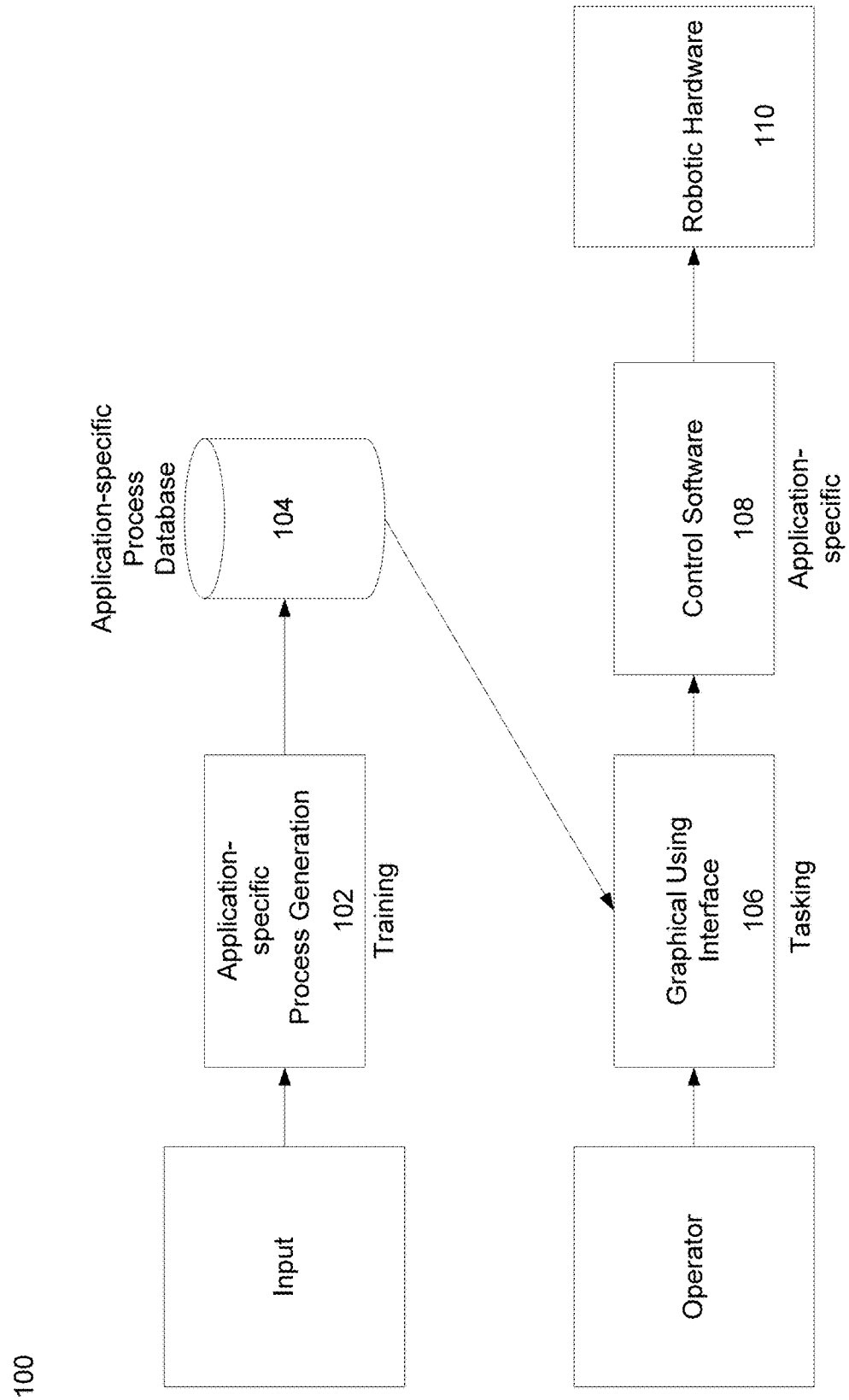
FIG. 1 is a block diagram of a natural tasking robotic system, according to an embodiment of the present disclosure.

Referring now to FIG. 1, an embodiment of a robotic system 100 is provided. System 100 may include a plurality of components, portions of which may be designed for a particular application and/or task. The first component of the system may include a software system 102 for adding new processes to a database 104. Once built, database 104 may be reused by operators in the field or remotely. Operators may select an element from the database 104 using a graphical user interface 106 for execution by the control software 108 as is shown in FIG. 1. Procedures for the particular application and/or task (e.g. welding, robotic assembly, etc.) may be added to database 104 by experts offline. This database 104 may be used with a graphical user interface 106 and tasking software online to develop each procedure for each task. The software modules may include, but are not limited to, training, tasking, and performance of the particular task, etc. All of this may be used to control the manner of operation of robotic hardware 110. Robotic hardware 110 may respond to the controls received from control software 108, however, it should be noted that the robotic hardware itself may be limited by its own maximum number of degrees of freedom as is discussed in further detail hereinbelow.

In a robotic system, the phrase "degrees of freedom" may refer to specific, defined modes in which a mechanical device or system can move. The number of degrees of freedom may be equal to the total number of independent displacements or aspects of motion. For example, a six degrees of freedom ("6DOF") scenario may refer to the freedom of movement of a rigid body in three-dimensional space. Specifically, the body may be free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). In contrast, placing a point in space may correspond three degrees of freedom, specifying a distance between two points on different links is one degree of freedom, etc.

In some embodiments, the phrase "robotic system", as used herein, may include a system of one, two, and/or any number of robots. In this way, an entire robotic system DOF may refer to the sum of the DOFs on each of the individual robots. This may include one DOF for each single-axis joint, and six DOF for a free-moving base. For example, for a robotic system that includes two robots, one having 6DOF and the other having 5DOF, the available entire robotic system degrees of freedom may be 11DOF.

Embodiments included herein may be configured to explore an extra number of degrees of freedom of one or many robots to perform a robotic task naturally. In this example, an entire robotic system may include a maximum number of degrees of freedom associated therewith DOF ("N") and may also include a minimum number of DOF ("M") subtracted therefrom.

For example, and referring now to FIG. 2, a 3D rendering from a graphical user interface 200 depicting a welding tool having five degrees of freedom contrasted with a welding tool having six degrees of freedom, full 3D rotation and orientation, is provided. The difference between the two is the five degrees of freedom may be found by relaxing rotation about one axis. This particular model was tuned to optimize a scan and weld process. This involved configuring the bounding volumes around the scanner tool, as well as aligning the system and base primary frames to make the tool paths and point clouds appear in the correct locations. The tool offsets were also configured based on how the tool paths were created from the point clouds. The paths were created along the bottom of the seams, so an offset from the tip was configured so there were no collisions. As shown in FIG. 2, the arm may be constrained using two different constraint sets, with each one using a different tool offset, one for scanning the workpiece and one for welding. The term "workpiece", as used herein, may refer to an object to be moved by a robot. The degrees of freedom set for scanning uses a six degree of freedom frame, and the welding set uses a five degree of freedom frame that allows the tip of the torch to freely rotate around the tip. This allows scanning for the workpiece first, then relaxing of the degrees of freedom for the weld paths, which are more difficult for the robot to achieve given its workspace envelope.

Figure 3:
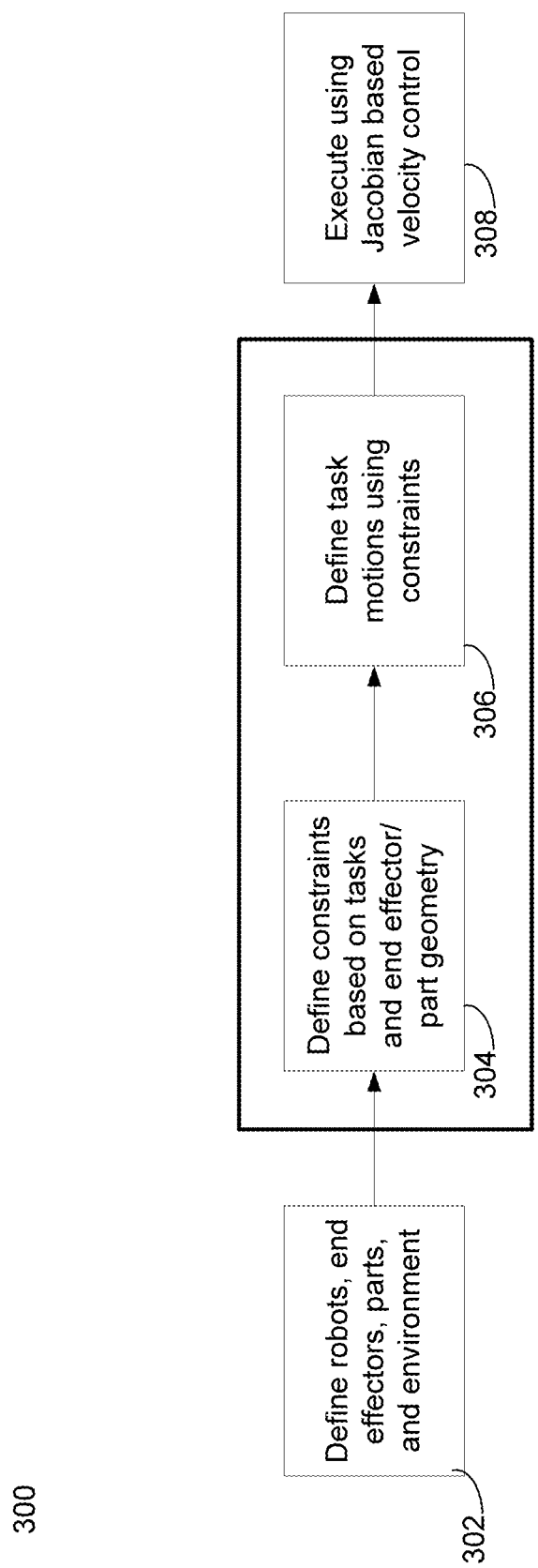
FIG. 3 is a block diagram of a natural tasking robotic system, according to an embodiment of the present disclosure.

In some embodiments, and referring now to FIG. 3, an embodiment depicting a flowchart having a number of operations consistent with a natural tasking robotic process is provided. Natural tasking process 300 may include defining 302 robots, end effectors, workpieces, and a robotic environment. Process 300 may further include defining 304 one or more constraints based upon, tasks, end effector geometry, workpiece geometry, etc. Process 300 may also include defining 306 one or more task motions using the constraints. Process 300 may be configured to define a minimal number of constraints naturally through analysis of geometry (e.g., end effector geometry), such as by finding axes of symmetry relative to a task. In this way, the naturalness of the constraint as well as an ability to exploit extra degrees of freedom in robot motion allow for natural control over the robot. Natural control, may be based upon, at least in part, both natural constraints as well as natural optimization of those constraints, as will be discussed in further detail below. In operation, once naturally optimized, the task may be executed 308 using a Jacobian-based velocity control approach as is discussed below.

Figure 4:
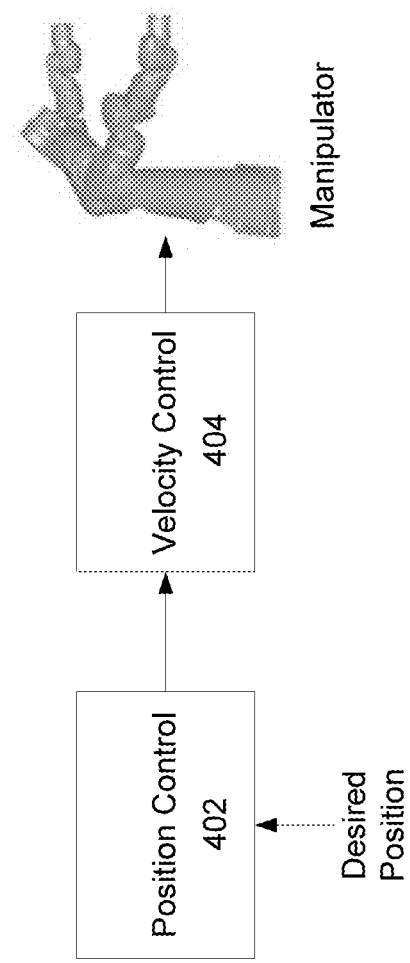
FIG. 4 is a block diagram of a velocity control approach for use in a natural tasking robotic system, according to an embodiment of the present disclosure.

In some embodiments, and referring now to FIG. 4, a block diagram 400 consistent with embodiments of the robotic system of the present disclosure is provided. Control of the end effectors of the robotic arms in a system may be accomplished using multiple components (e.g., using Energid's Actin® software). These components may include, but are not limited to, outer position controller 402 and inner velocity controller 404. This combined control system 400 allows the program to "fly" the end effector throughout task space by specifying a desired placement, and joint velocities and positions may be calculated automatically. This frees the operator to focus on the task, rather than low-level control of the robot.

In some embodiments, the core velocity framework may be based on the manipulator Jacobian equation:

$$V = J(q)\dot{q} \tag{1}$$

Here V is an m-length vector representation of the motion of the end effector (usually some combination of linear and angular velocity referenced to points rigidly attached to parts of the manipulator); q is the n-length vector of joint positions (with $\dot{q}$ being its time derivative); and J is the m×n manipulator Jacobian, a function of q. (For spatial arms with a single end effector, V is often the frame velocity with three linear and three angular components. As used herein, it takes on a larger meaning that includes the concatenation of point, frame, or other motion of multiple end-effectors.) The Jacobian J(q) is the matrix that makes ( ) true for all possible values of $\dot{q}$. Note V can represent a concatenation of values for multiple end effectors, enabling coordinated motion of multiple points on the manipulator.

The velocity control question is the following: given a desired end effector motion V, what are the joint rates $\dot{q}$ that best achieve this motion? To answer this, the framework is based, in part, on the approach below, which uses a scalar $\alpha$, a matrix function W(q), and a scalar function $f(q)$ to solve for $\dot{q}$ given V through the following formula:

$$\dot{q} = \begin{bmatrix} J \\ N_J^T W \end{bmatrix}^{-1} \begin{bmatrix} V \\ -\alpha N_J^T \nabla f \end{bmatrix} \quad (2)$$

Where $\nabla f$ is the gradient of $f$ and $N_J$ is an n×(n×m) set of vectors that spans the null space of J. That is, $JN_J=0$, and $N_J$ has rank (n×m). Both $\nabla f$ and NJ are generally functions of q. By changing the values of $\alpha$, W, and $f$, many new and most established velocity-control techniques can be implemented.

Embodiments of the present disclosure, however, go beyond the formulation above to create a more general framework. Instead of insisting on the use of the gradient of a function, a general column vector F(q) is used. Not all vector functions are gradients. This minor, but important, modification yields the following formula:

$$\dot{q} = \begin{bmatrix} J \\ N_J^T W \end{bmatrix}^{-1} \begin{bmatrix} V \\ -\alpha N_J^T F \end{bmatrix} \quad (3)$$

This achieves the desired V while minimizing:

$$½\dot{q}^T W\dot{q} + \alpha F^T \dot{q} \quad (4)$$

The parameters $\alpha$, W and F can be defined using XML to give many different types of velocity control.

In some embodiments, position control system 402 may build upon the velocity control system 404 to give robust position control to the end effectors. A position control module may be supplied as an interface to the position control system 402 to enable the addition of new position control algorithms. Position control system 402 may provide basic position control for the end effectors by building upon velocity control system 404. Given the joint velocities from velocity control system 404, position control system 402 may use Euler integration to calculate the joint positions. Once the joint positions are calculated, the end effector positions are known. The control system may check for joint limit exceedance and collisions as it is iterated forward in time. It may also zero the joint rate commands if a singularity is detected.

In some embodiments, the control methodologies discussed above may be used, at least in part, to allow for the controller to relate the entire robotic system DOF (e.g., the available DOF of the system, "N") to the required minimum number of degrees of freedom identified based on the workpiece constraints alone ("M"). In other words, the robotic system and method described herein may only need workpiece data in order to execute a natural robot task. In some cases, the DOF may be based upon other factors as well, including but not limited to, other factors or constraints, however this information may not be necessary. Embodiments of the robotic system and methods provided herein may be available to provide better control and/or increased performance of the robotic system, more feasible and/or optimized solutions for a robotic task, etc.

The phrase "maximum number of degrees of freedom" may refer to a maximum number of specific, defined modes in which a mechanical device, robot(s), and/or system may move. The phrase "minimum number of degrees of freedom" may refer to a minimum number of specific, defined modes in which a mechanical device, robot(s), and/or system move to execute a task naturally. The phrase "natural robot task" may refer to a task that may be performed using a reduced and/or simplified amount of motion. In some cases specifying a natural robot task may be contrasted with a math intensive way of specifying a task that may require a user to specify in robotic system's coordinate/frame The natural robot task may be specified/demonstrated to the robotic system using one or more robots or end effectors and the minimum number of degrees of freedom may be determined based upon, at least in part, the natural robot task. The minimum number of degrees of freedom may be determined through analysis of end effector, robot, and/or workpiece geometry. It may be specified using a demonstration, teach to learn robotic techniques, using a GUI, etc.

In some embodiments, the naturalness of the task may refer to the degree of alignment between 1) the commanded robot task and 2) the actual desired thing to be done. Some examples are provided below:

Desired task (1): Place a cup on a desk.
  Unnatural: Place a cup with handle pointing to the right at x=30, y=50 cm from the corner.
  Natural: Place the cup anywhere within the bounds of the table with the handle pointed in any direction.
Desired task (2): Point a camera on the robot at 3D point x=1, y=2, z=2 in space.
  Unnatural: Place the camera at x=0, y=0.2, z=0.3 and pointed it at x=1, y=2, z=2.
  Unnatural: Point the camera at {1,2,2} from any location with up in the image aligned with up in the real world.
  Natural: With no constraint on camera position, point the camera at {1,2,2} with any orientation.
Desired task (3): Spray paint a workpiece using a nozzle 1 m away and pointed directly at the center of the workpiece.
  Unnatural: Spray from 1 m away with the nozzle pointed at the workpiece and specially oriented about its axis.
  Natural: Spray from 1 m away with no special orientation of the nozzle other than pointing it at the workpiece.

It should be noted that although these unnatural constraints may seem odd in how they over restrict robot motion, they are actually how these kind of tasks are typically performed. Embodiments of the robotic system included herein allow using and solving for the natural representation.

In some embodiments, the phrase "natural workpiece constraint" may relate to geometrical features, and/or any other aspect associated with a particular workpiece. The phrase "natural environmental constraint" may relate to geometrical features, obstacles, and/or any other aspect associated with an environment that may be associated with a natural robot task.

In some embodiments, workpiece constraints, environmental constraints, and manipulator constraints may form a continuum in this approach, and multiple natural constraints can be combined to define a comprehensive tasking movement. Some of these may include, but are not limited to, directional constraints, orientation constraints, assignment to a curve or surface, distance constraints, joint positions, linear and nonlinear functional combinations of joint positions, center of mass, and linear and angular momentum. These constraints may vary as a function of robot configuration. End effector offsets, static workpieces or obstacles, and dynamic workpieces or obstacles may be used to define and configure the constraints. In some embodiments, the identification of the minimum number of degrees of freedom may be based on the workpiece constraints geometry and/or its features, some of which may include, but are not limited to, holes, shapes, sizes, etc.

In some embodiments, one or more constraints may be combined and/or specified by the user using a visual editor to create complex combinations of constraints that change over time to best achieve a real-world task. It should be noted that some or all of these constraints may be changed during execution of a robot task or operation, even time step by time step, and may be combined with optimizations such as collision and joint-limit avoidance. In this way, the number and type of constraints may be updated, dynamically, in real-time. For example, in some embodiments, some or all of the constraints may be automatically determined and/or identified using a scanner that may be configured to scan the robotic environment to identify, allow for the necessary processing, and subsequent determinations. Various sensors and devices may be used to obtain this data, some of which may include, but are not limited to, data from lidar, stereo cameras, color cameras, multispectral cameras, etc. Additionally and/or alternatively, some or all of the constraints may be updated remotely over a communication channel (e.g., radio, laser, or network communication, etc.). The constraints are set using a 2D graphical user interface or a 3D interface (e.g., augmented reality, etc.). The constraints may be of the "less than or equal to" variety, not just "equal to". Accordingly, the robotic system included herein may allow a user to constrain a point to be above the floor not just on it, for example.

Accordingly, embodiments of the robotic system described herein may include one or more robots having a maximum number of degrees of freedom "N". In some embodiments, the system may allow a user to specify (e.g., teaching the robotic system by example, performing a robot "watch" and learn using one or more sensors, using a GUI such as a teach pendant to perform a demo, etc.) a task naturally by indicating only what needs to be done, such as insert a peg in a hole (using five degrees of freedom in constraint), follow a line with the tip of a welding tool (using three degrees of freedom in constraint), or point a camera at a location in space (using two degrees of freedom in constraint), etc. Specifying a task naturally may include specifying the task using a demonstration, for example, teaching or learning the robot how to perform the task. Additionally and/or alternatively, the user may not specify how the robotic system may perform the task and the system may determine how to perform the task automatically or using minimal inputs.

In some embodiments, the robotic system described herein may be configured to determine the minimum number of degrees of freedom "M" that may be required to perform the natural robot task, while M<=N. The robotic system may be configured to determine, via exploring the extra (N−M) extra degree of freedom, the most natural or efficient manner in which to perform the task. This may involve optimizing secondary criteria using the extra degrees of freedom. For example, a controller (e.g. Actin) may help to enable exploring the extra degrees of freedom (N−M) as discussed above. The extra number of degrees of freedom may be used to determine more convenient, faster, energy efficient, and/or feasible, "ways" to perform the task. The way or manner of performing may be based upon, at least in part, the determination of collision free paths, coordination of robots (if more than one), etc. In some embodiments, executing or performing the natural robot task may be at least partly employed using various software methodologies (e.g., using Energid's Actin® software). Determining the way or manner of performing the task naturally may also include using one or more simulators that may be configured to perform a simulation. The results of such a simulation may be used to determine how to perform the task.

In some embodiments, exploring the extra degrees of freedom (N−M) may include completely relaxing some DOF (e.g., the "Z" dimension). Additionally and/or alternatively, embodiments included herein may be configured to relax a DOF partially, for example, allow Z to free spin within +−15 degrees. As used herein, the phrase "free spin" may refer to allowing for unconstrained robot motion in at least one axis (e.g., end effector axis, etc.). The same concept may be applied to any DOF to provide flexibility when specifying a natural task. Accordingly, this may allow the robot system to find a solution in a more efficient manner.

In some embodiments, the robotic system described herein may be configured to specify one or more robot poses. Commonly, robots may be programmed as a series of poses, i.e. particular orientations of the robot's joints and rigid elements. The robot may then cycle through these poses under the command of a robot controller to accomplish some task. For example, picking up a workpiece with its end effector and transporting it to a new location, moving a paint sprayer through a series of positions, etc.

In some cases, sensory input to the robot may be limited to error signals, pause signals, or speed signals. These signals only stop, pause, or slow the movement of the robot through its series of poses, but do not affect the poses themselves. In more advanced cases, sensory input to the robot may be used to affect the poses themselves. For example, a 2D camera may be used to identify the position of a workpiece on a flat surface in a known position. From this, a robot pose to pick up the workpiece may be calculated. Generally, only a single robot pose may be calculated for any given sensory input. This minimizes calculation time, but does not take in to account the most efficient path for the robot to achieve the pose, whether the robot pose at workpiece pick-up also yields a correct path for the robot to put the workpiece down again, or the most efficient path between those points.

Allowing robot pose calculation and motion control based on multiple possible robot poses is desirable for more efficient motion, and discovery of more realizable pose combinations. Unfortunately, specifying the possible robot poses requires understanding robot kinematics, and applying them to every specific case in the robot picking and placing task. It has heretofore been impractical or impossible for an unskilled user to specify these variables. Accordingly, embodiments included below may be used to specify these variables indirectly, simply by describing a few characteristics of the workpiece, end effector, and workpiece placement target.

Figure 5:
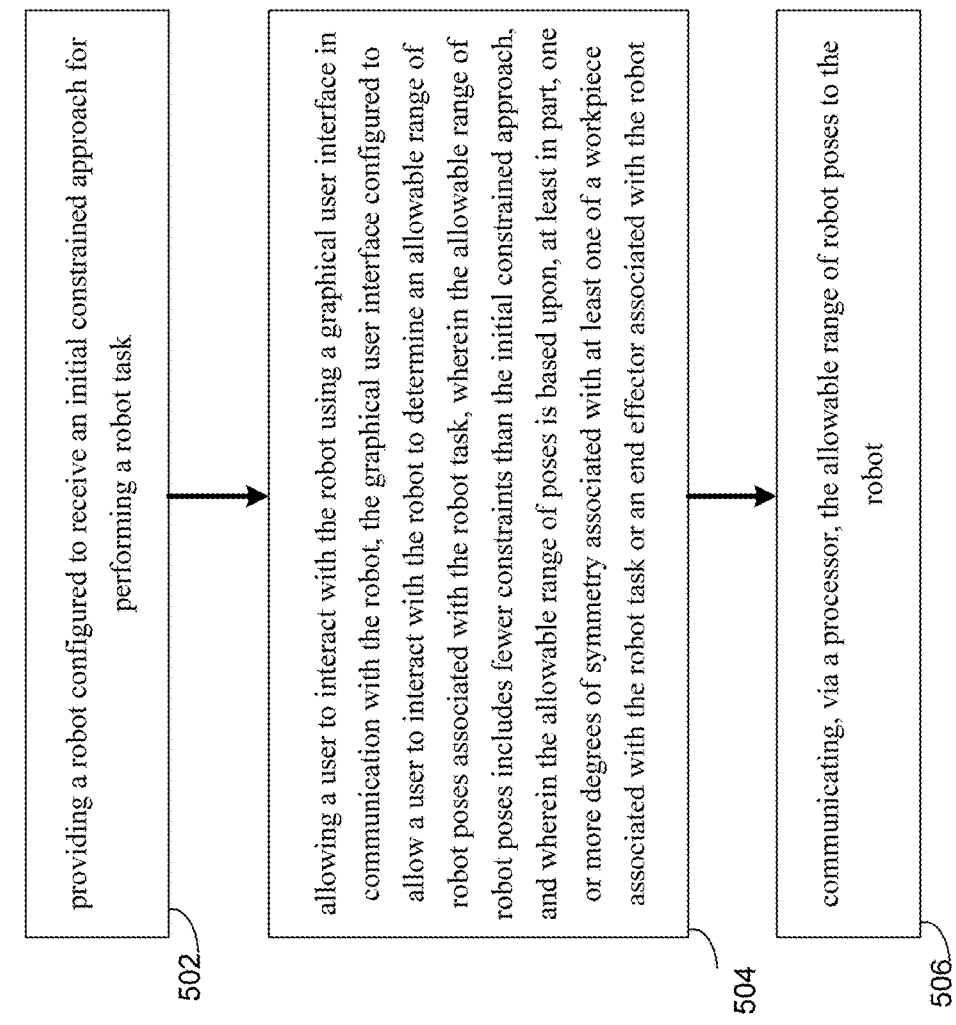
FIG. 5 is a flowchart of a natural tasking robotic method, according to an embodiment of the present disclosure.

In some embodiments, and referring now to FIG. 5, an embodiment depicting a flowchart having a number of operations consistent with a robotic process 500 is provided. The process 500 may include providing (502) a robot configured to receive an initial constrained approach for performing a robot task. The process may further include allowing (504) a user to interact with the robot using a graphical user interface in communication with the robot, the graphical user interface configured to allow a user to interact with the robot to determine an allowable range of robot poses associated with the robot task, wherein the allowable range of robot poses includes fewer constraints than the initial constrained approach, and wherein the allowable range of poses is based upon, at least in part, one or more degrees of symmetry associated with at least one of a workpiece associated with the robot task or an end effector associated with the robot. The method may also include communicating (506), via a processor, the allowable range of robot poses to the robot.

Figure 6:
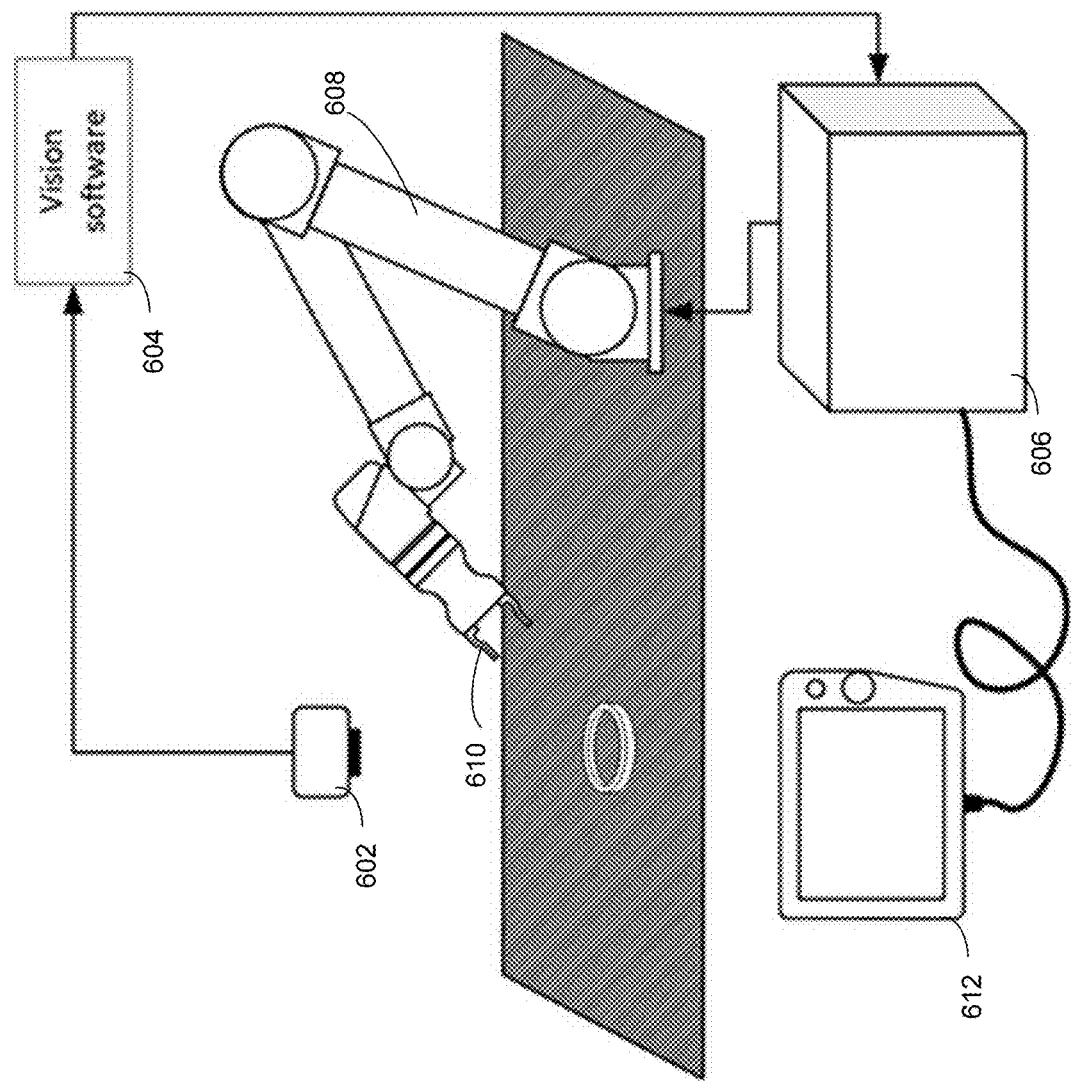
FIG. 6 is a system diagram of a natural tasking robotic system according to an embodiment of the present disclosure.

Referring now to FIG. 6, an embodiment of a robotic system 600 is provided. In this example, a camera 602 (e.g. 2D, 3D, etc.) may be used to identify the position of a workpiece on a flat surface in a known position. In some embodiments, vision software 604 may be used to calculate the coordinates of the workpiece in a 3D space and pass this to the robot controller 606. Controller 606 may then calculate a pose for robot 608 to assume to enable the robot's end effector 610 to pick up the workpiece. A teach pendant 612 having a graphical user interface associated therewith may provide the user with the ability to control robotic system 600 as is discussed in further detail hereinbelow.

In operation, the user may demonstrate to the robotic system how to perform a particular task. This demonstration may be received using any suitable approach, including, but not limited to, via a graphical user interface, the user physically guiding the robot, using a simulation, using a pre-generated program, using a program generated in real-time, etc. The demonstration may provide an initial constrained approach that shows the robotic system exactly how to perform the particular task. In previous systems, once the initial constrained approach has been learned/input the system may use the same pick pose, place pose, path, etc. to perform the task.

In some embodiments, the robotic process described herein may allow for a relaxation of the initial constrained approach by determining an allowable range of poses that may reduce the number of constraints from the initial constrained approach. Accordingly, embodiments of robotic process may identify and subsequently allow for a range of poses for picking and/or placing a workpiece any of which being acceptable for accomplishing the task. In some embodiments, the least constraining option may be provided and/or selected (e.g. automatically).

In some embodiments, the allowable range of poses may be based upon, at least in part, a workpiece geometry, an end effector geometry, a combination of both geometries, a portion of either geometry, a portion of both geometries, etc. It should be noted that these geometries may be received using any suitable approach, including, but not limited to, scanning, user input via graphical user interface, accessing one or more pre-determined or real-time generated programs, etc.

In some embodiments, one or more degrees of freedom associated with the robot may be partially or completely relaxed. The process may then determine and/or plan the appropriate path and/or poses for the robot to implement the task. This may include, but is not limited to, determining redundant degrees of freedom, considering environment obstacles, system performance optimization (e.g., energy efficiency), specific metric optimization, etc.

Figure 7:
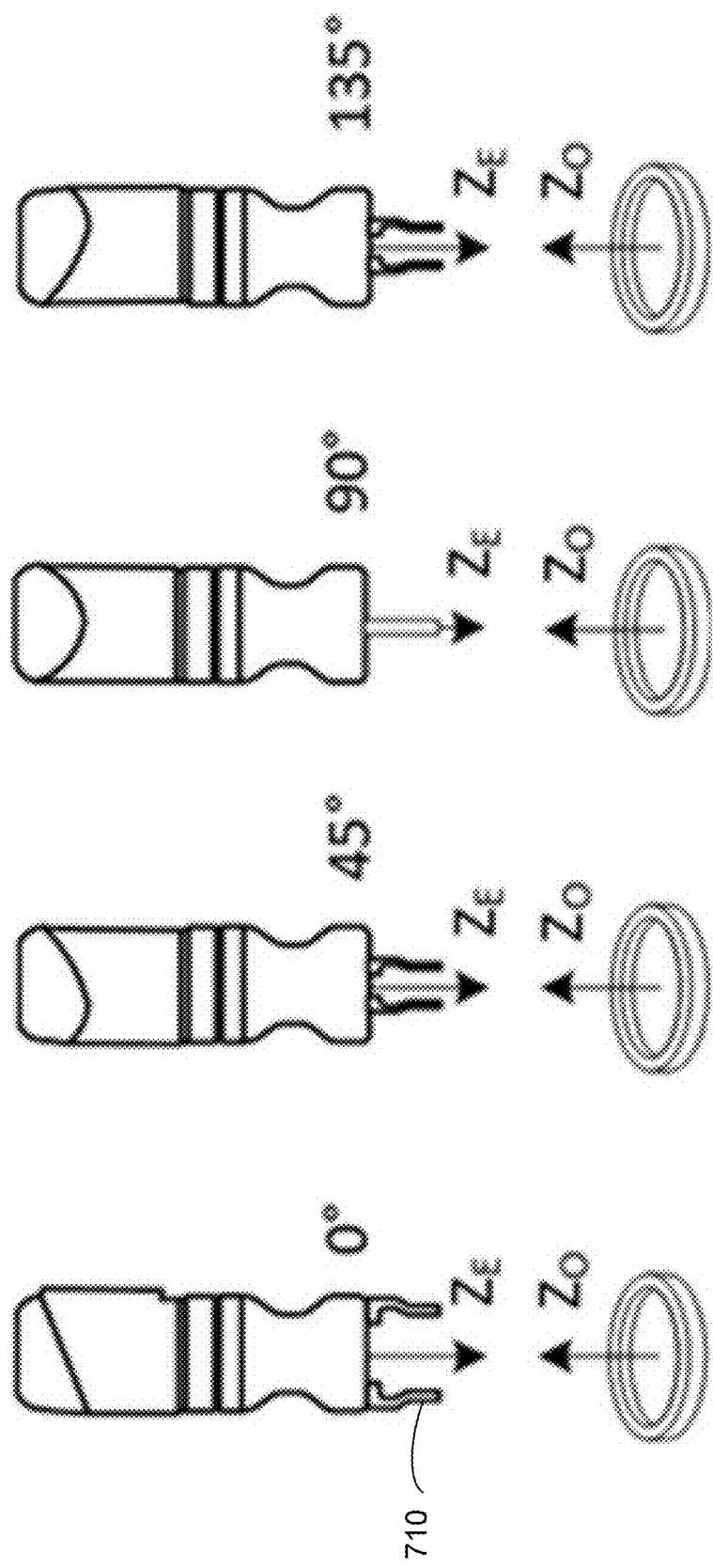
FIG. 7 shows examples of robot poses that may be used to pick up a workpiece or workpiece according to embodiments of the present disclosure.

Referring now to FIG. 7, an embodiment of a robotic system 700 is provided. In this example, it can be seen that there are many possible robot poses that the robot could assume to pick up the workpiece. Since the workpiece may be rotationally symmetrical with respect to an axis $Z_O$ normal to the flat surface, any robot pose that positions the robot's end effector so that its $Z_E$ axis aligns with the workpiece's $Z_O$ axis may enable the robot to pick up the workpiece with end effector 710. In this example, the robot may pick up the workpiece by positioning the fingers of its end effector 710 inside of the ring of the workpiece, and expanding the fingers so as to create an internal grip of the workpiece, though numerous other options are also available.

Figure 8:
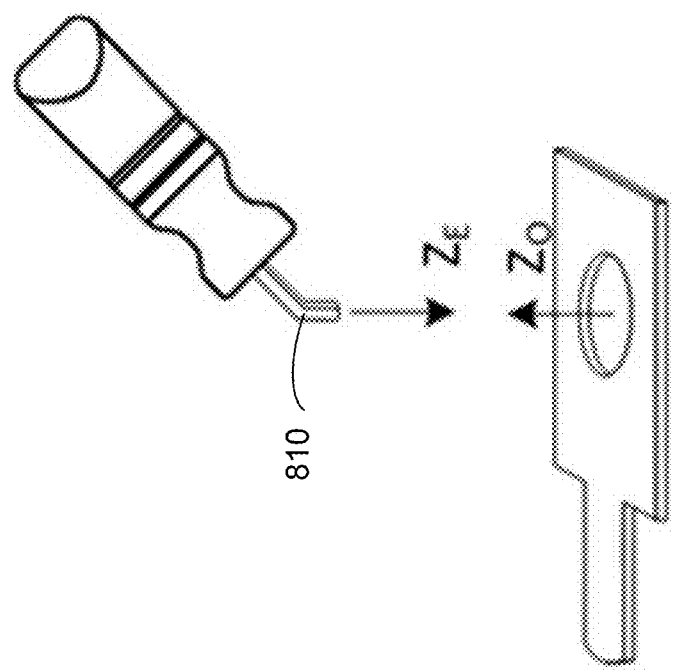
FIG. 8 shows an example of a workpiece placement target according to embodiments of the present disclosure.

Referring now to FIG. 8, an embodiment of a robotic system 800 is provided. In this example, robot end effector 810 has an approximately 45° bend. The end effector's $Z_E$ axis has been redefined to align to the end of the fingers, so it is rotated 45° relative to the end effector in FIG. 7. Also, the workpiece on the flat surface is not rotationally symmetrical with respect to an axis $Z_O$ normal to the flat surface. However, the workpiece does have a circular cutout with the same dimensions as the inside of the workpiece in FIG. 7, suitable for an internal grip just like in FIG. 7. It should be noted that any robot pose that positions the robot's end effector 810 so its' $Z_E$ axis aligns with the workpiece's $Z_O$ axis may enable the robot to pick up the workpiece with its end effector 810. FIG. 8 also shows a workpiece placement target 814. The workpiece placement target 814 requires a specific pose for the workpiece upon placement. If the robot has sufficient reach, and the environment around the workpiece placement target 814 is unconstrained, the robot may be able to place the workpiece in the target regardless of the pose the robot assumed to pick up the workpiece. The examples shown in FIGS. 7-8 afford many options for planning the robot path to the workpiece, and from the workpiece to the workpiece placement target. The increased number of options allow for computation of the most efficient path, or the most likely degree of picking success.

Referring now to FIG. 9, an embodiment of a robotic system 900 is provided. This example shows the same conditions as in FIG. 8, but with obstacles around the workpiece placement target. In this example, only robot poses that position end effector 910 within a 180° arc may allow placement of the workpiece in the target. To enable the robot to always place the workpiece in the target, the robot pose when picking up the workpiece should be limited to the same 180° arc. There are still multiple options for computing the robot poses and paths between them, but the number of options is more limited.

Figure 10:
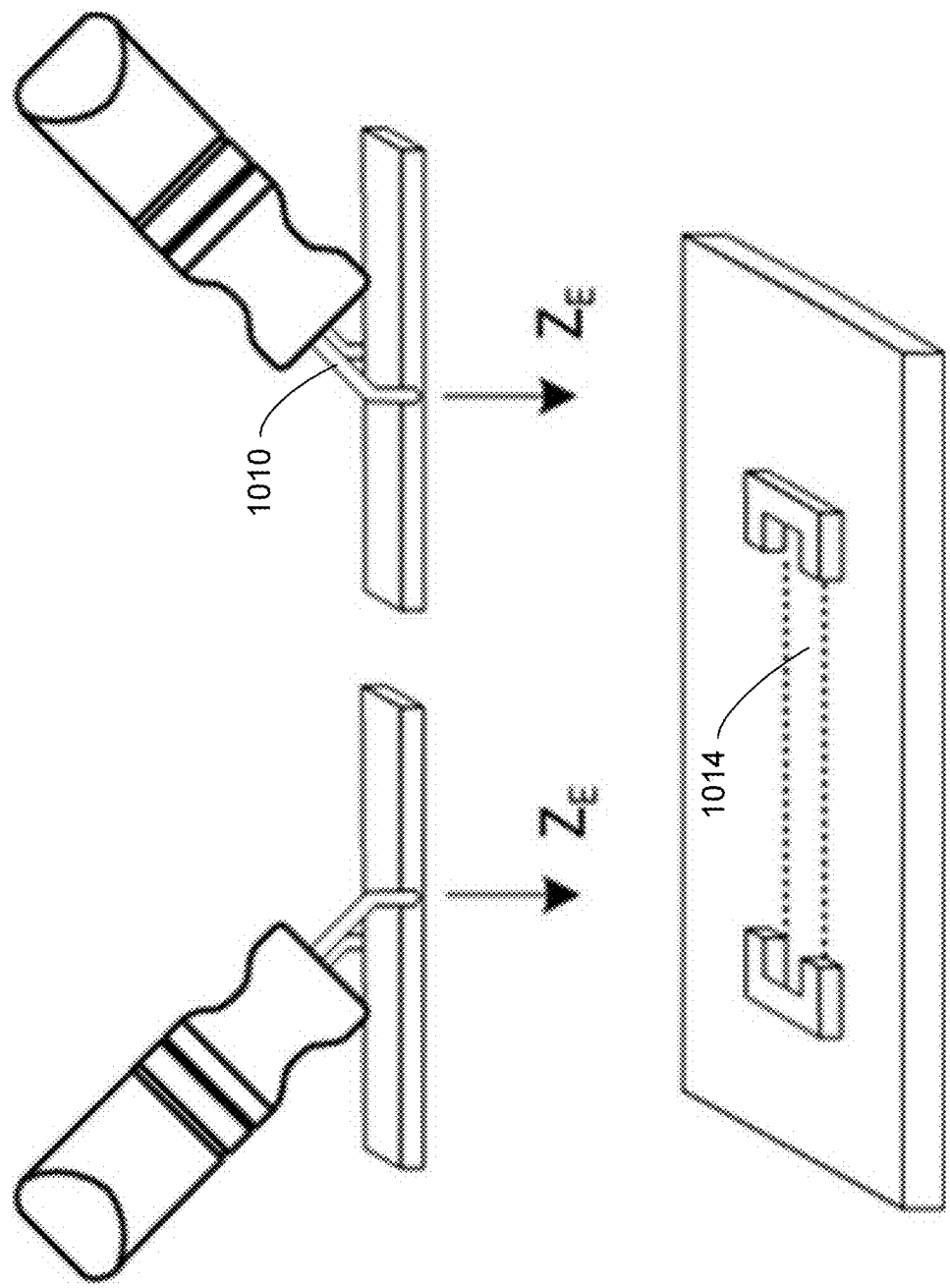
FIG. 10 shows an example of a rectangular workpiece and rectangular workpiece placement target according to embodiments of the present disclosure.
Figure 11:
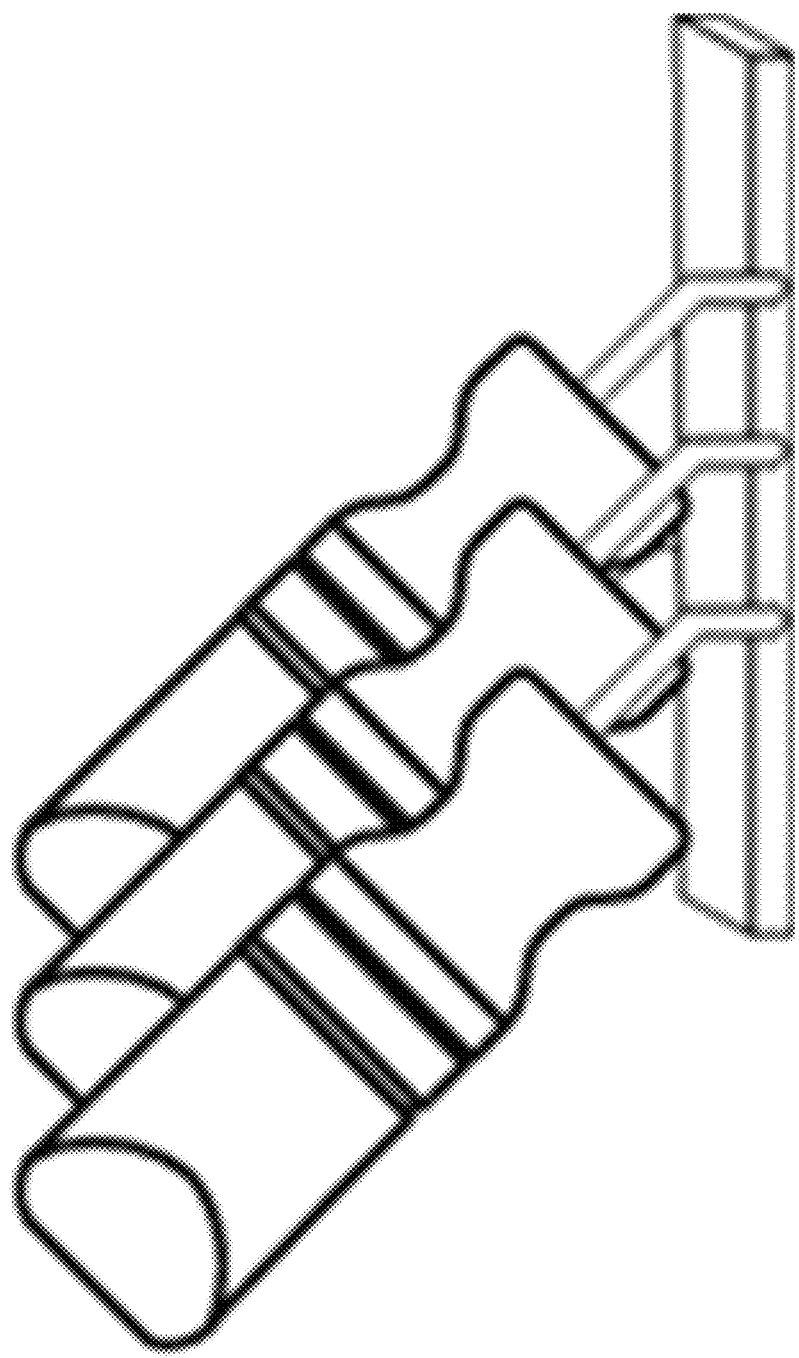
FIG. 11 shows an example depicting how a workpiece may be gripped in multiple positions according to embodiments of the present disclosure.

Referring now to FIG. 10, an embodiment of a robotic system 1000 is provided. This example shows a rectangular workpiece and a rectangular workpiece placement target 1014. In this example, the robot may pick up the workpiece by gripping it from the outside with end effector 1010 positioned as shown in the left portion of FIG. 10, or positioned 180° rotated relative to its $Z_E$ axis as shown in the right portion of FIG. 10. In addition, the workpiece may be gripped in multiple positions along the long axis of the workpiece, shown in FIG. 11. All of these gripping positions allow placement in the workpiece placement target 1014. Due to limitations in the static friction between the end effector fingers and the workpiece, and due to position of the center of mass of the workpiece, only a subset of all possible gripping positions along the long axis will have acceptable performance.

Figure 12:
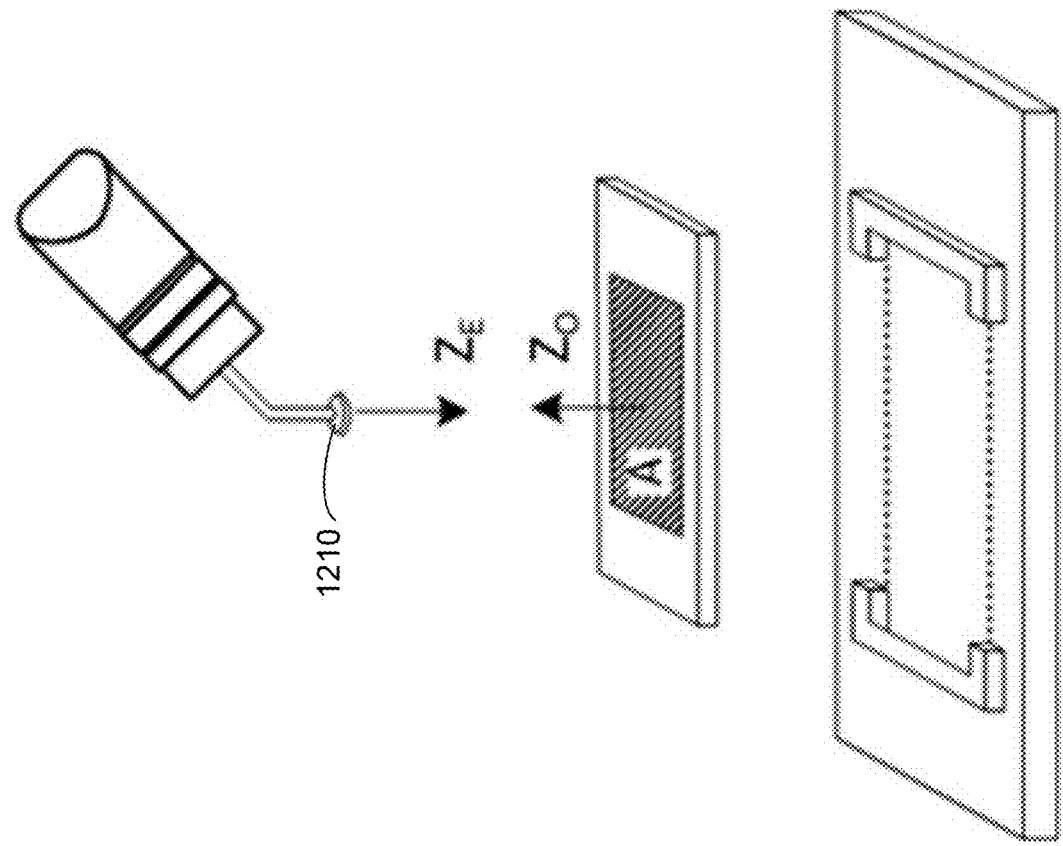
FIG. 12 shows an example of a rectangular workpiece and rectangular workpiece placement target according to embodiments of the present disclosure.
Figure 13:
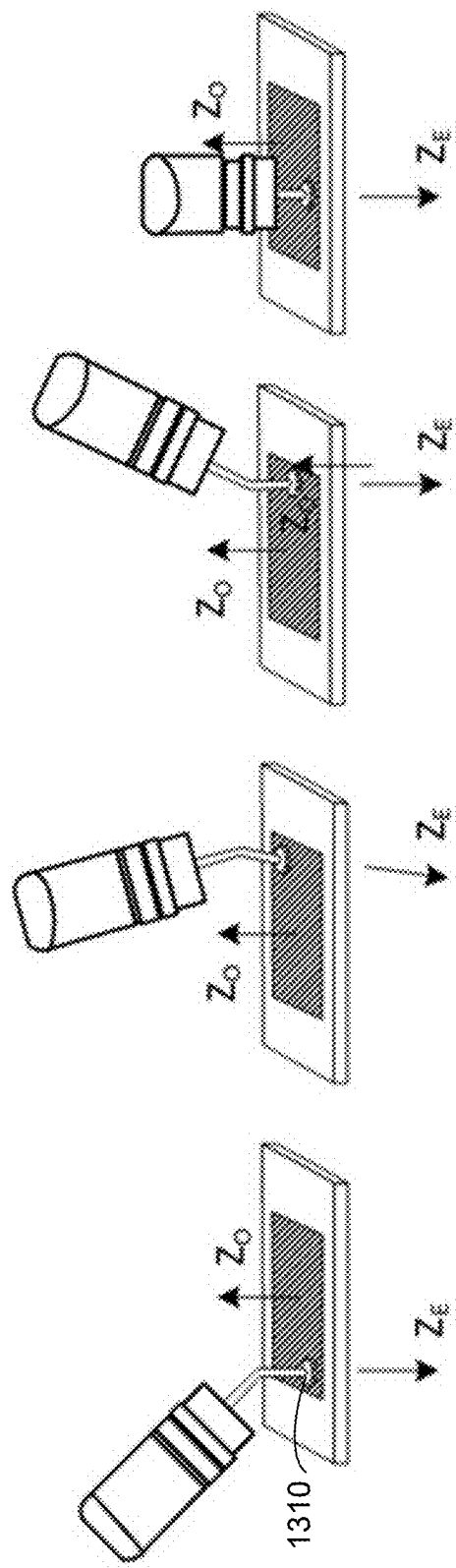
FIG. 13 shows an example of a rectangular workpiece and rectangular workpiece placement target according to embodiments of the present disclosure.

Referring now to FIG. 12, an embodiment of a robotic system 1200 is provided. This example shows a rectangular workpiece, a rectangular workpiece placement target, and a vacuum suction cup end effector 1210. Any contact of the suction cup within the area A shown on the workpiece will result in a successful pick-up of the workpiece. As shown in FIG. 13, end effector 1310 may have any rotation around is axis $Z_E$, with the suction cup positioned anywhere in the area A. In addition, the flexible nature of the suction cup may provide acceptable performance if the position of the suction cup on contact is anywhere within 10° of normal relative to the workpiece axis $Z_O$.

Figure 14:
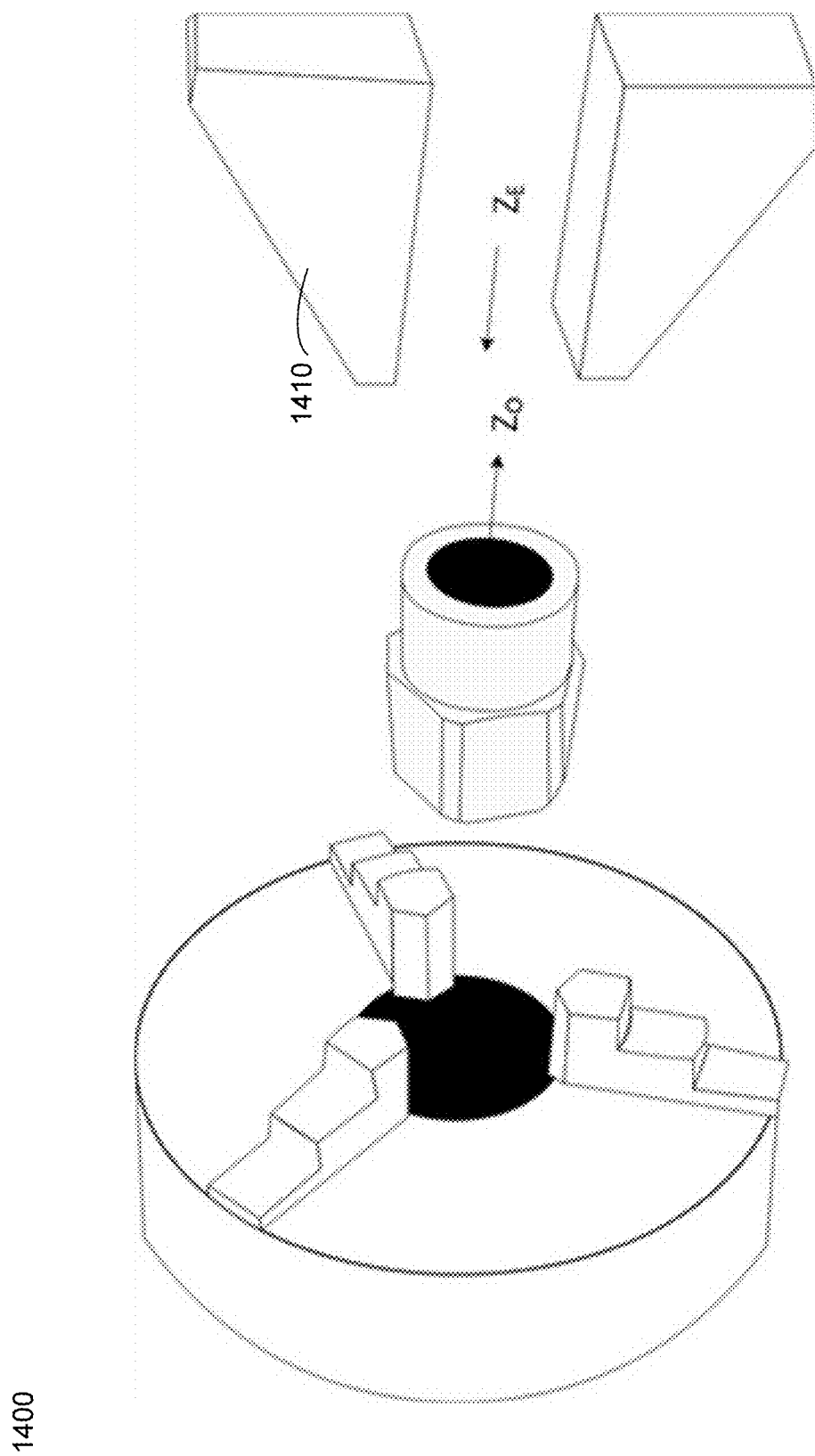
FIG. 14 shows an example of a roughly cylindrical workpiece according to embodiments of the present disclosure.

Referring now to FIG. 14, an embodiment of a robotic system 1400 is provided. This example shows a roughly cylindrical workpiece with a hexagonal cross section on one end, and a circular cross section on the other end. The workpiece placement target is a 3-jaw machine chuck. In this example, end effector 1410 is a mechanical gripper designed for gripping workpieces from the outside. To place the workpiece correctly in the chuck, a flat side of the workpiece's hexagonal half must align with one of the chuck's jaws. Since the mechanical gripper is contacting the round side of the workpiece, and the gripping feature of the workpiece is rotationally symmetrical with respect to the axis $Z_O$, any robot pose that positions the robot's end effector so it's $Z_E$ axis aligns with the workpiece's $Z_O$ axis will enable the robot to pick up the workpiece with its end effector. However, regardless of how the workpiece was picked up, in this particular example, there are only six workpiece poses that will result in correct placement of the workpiece in the machine chuck, one every 60° of rotation of the workpiece around its $Z_O$ axis.

The embodiments described above illustrate that picking and placing performance may be enhanced by allowing for more options in the position of the robot end effector relative to the workpiece and workpiece placement target, but at the cost of a difficult process to understand and specify the limitations within these options. This complexity is increased if, unlike in the examples, workpiece picking is 3-dimensional, such as when workpieces are randomly distributed in a bin.

Embodiments described herein include a process for synthesizing the motion limitations based upon a set of characteristics of the components of the system. The characteristics may be specified in a graphical user interface used as part of programming the robot or the application as is discussed in further detail hereinbelow.

As used herein, the phrase "pick feature" may refer to some section of the workpiece that may be used as the point of contact or mating contact for a robot end effector. A "place feature" may refer to some section of the workpiece or of the place target that may be used as the point of contact or mating contact between the workpiece and the place target for the workpiece. The phrase "workpiece feature" may refer to either a pick feature or a place feature or both. The phrase "coordinate frame", as used herein, generally refers to three orthogonal axes that may correspond to each robot, workpiece feature, robot end effector, and workpiece placement target. The term "symmetry" of a workpiece feature, robot end effector, and workpiece placement target, as used herein, may be described in terms of whether that feature, robot end effector, or workpiece placement target has identical performance for its intended picking or placing operation, when rotated around one or more of the three axes of its coordinate frame. When the workpiece feature, robot end effector, or workpiece placement target may be rotated any degree around one of its axes, with identical, or substantially identical, performance for picking or placing, it has "continuous symmetry" around that axis. When the workpiece feature, robot end effector, or workpiece placement target may be rotated any whole number of increments around one of its axes, but more than one and less than infinite increments, with identical performance for picking or placing at each increment, it has "discrete symmetry" around that axis. When the workpiece feature, robot end effector, or workpiece placement target may be rotated only one complete revolution (i.e. an identity operation) around one of its axes, to have identical performance for picking or placing, it has "asymmetry" around that axis.

Accordingly, unconstraining robot axes and exploiting symmetries in the workpiece, end effector, and/or place target, may lead to smoother paths, more possible picks, and better bin emptying (e.g., in a situation where the workpiece may be randomly placed in a bin). Embodiments included herein may institute a default of constrained motion. If a user demonstrates or programs a pick or a place, the system may duplicate that exact alignment of workpiece, end effector, and place target on every pick & place. All unconstrained motions may be displayed using a graphical user interface (e.g., in advanced tabs) such as those discussed below. Accordingly, this may simplify the creation of a user's first program and therefore match his/her intuitive understanding of how most systems work, which is suitable for debugging a program using hand-arranged workpieces.

In some embodiments, unconstraining motion may be performed incrementally. For example, unconstraining the end effector rotation during a pick has an incremental benefit. Moreover, unconstraining the workpiece pose during placement has an independent, but additive benefit.

In some embodiments, unconstraining robot axes may not be specified directly as it may require an advanced understanding of kinematics and robots in general. Instead, embodiments included herein may provide a wizard or a means of entering characteristics that may query the user about characteristics of the workpiece, the end effector, and/or the place target. The system may use this information to calculate and apply motion constraints. This may simplify user training and free the user from having to consider, for example, the combinations of end effector and workpiece characteristics that affect unconstraining the robot. The salient workpiece, end effector, and place target characteristics are symmetry.

As discussed above, embodiments of the present disclosure may allow for the analysis of various types of symmetry before, during, and/or after aspects of the process. In some embodiments, the only symmetry information that may be needed to unconstrain robot axes are those of the pick feature on the workpiece, the place feature on the workpiece, the end effector, and/or the place target. In some embodiments, the system may only need to know about rotational symmetry. Rotational symmetry is always relative to some axis of rotation. In some embodiments, all rotational symmetry may be around one of the three axes of the associated frame, e.g., the x, y, or z axis.

Figure 15:
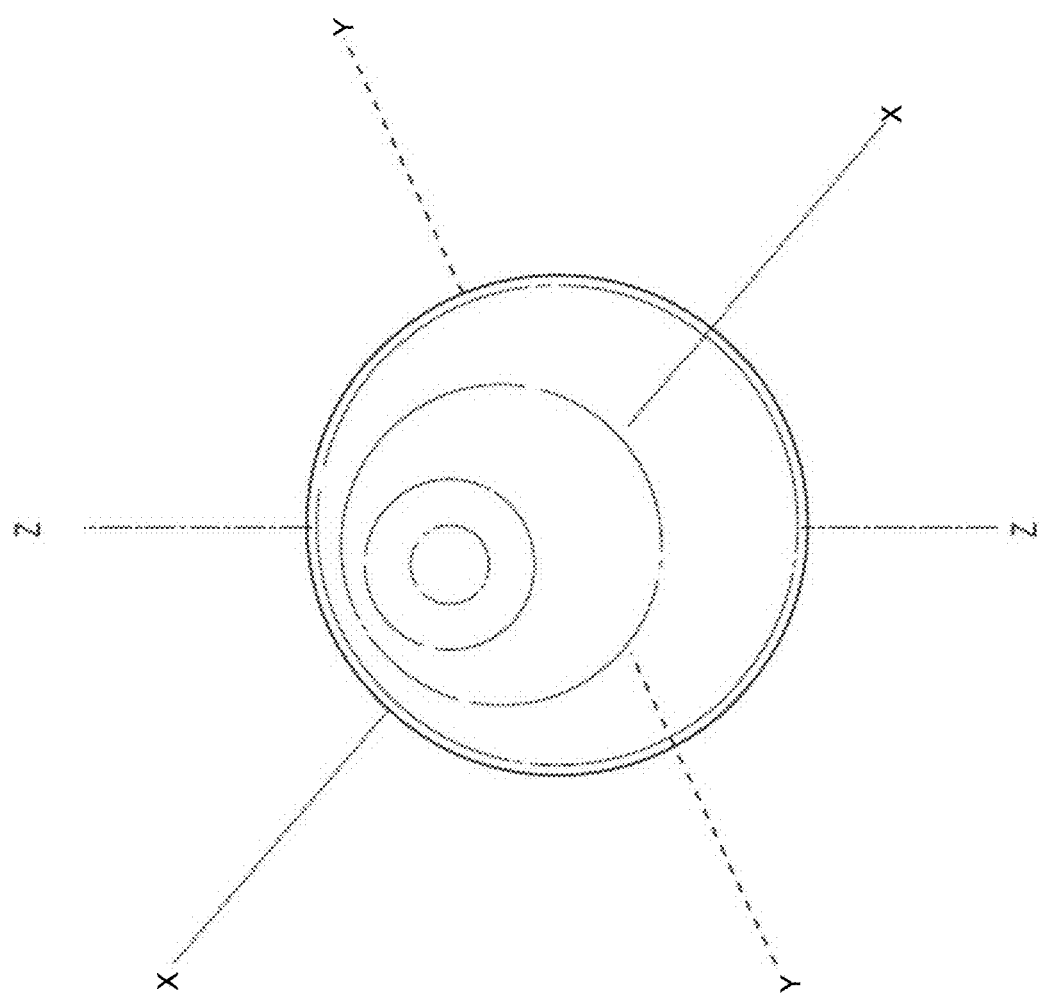
FIG. 15 shows an example of a workpiece having continuous symmetry around all three axes according to embodiments of the present disclosure.
Figure 16:
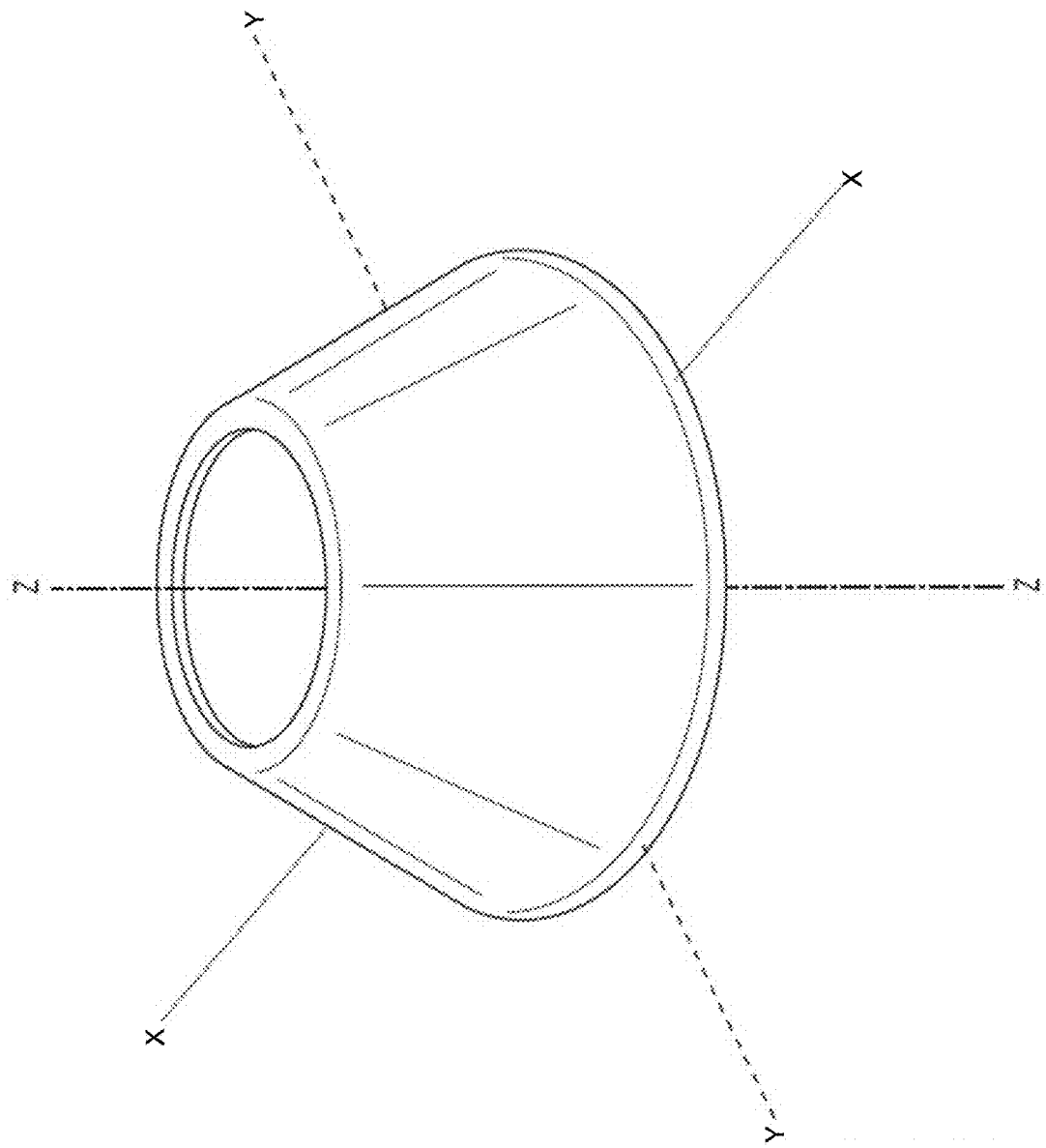
FIG. 16 shows an example of a workpiece having continuous symmetry around the z axis according to embodiments of the present disclosure.

Referring now to FIGS. 15-16, embodiments depicting examples of workpiece symmetry are provided. In some embodiments, in the case of a workpiece, symmetry rotations may be relative to the coordinate frame associated with the workpiece (e.g., embedded in a CAD file, mesh file, etc.). FIG. 15 shows a workpiece with continuous symmetry around all three axes, in this example, a sphere. FIG. 16 shows a workpiece with continuous symmetry around the z axis.

In some embodiments, for unconstraining the robot axes for pick and place, the symmetry of the pick feature and the place feature may be considered separately from each other, and from the overall workpiece symmetry.

Figure 17:
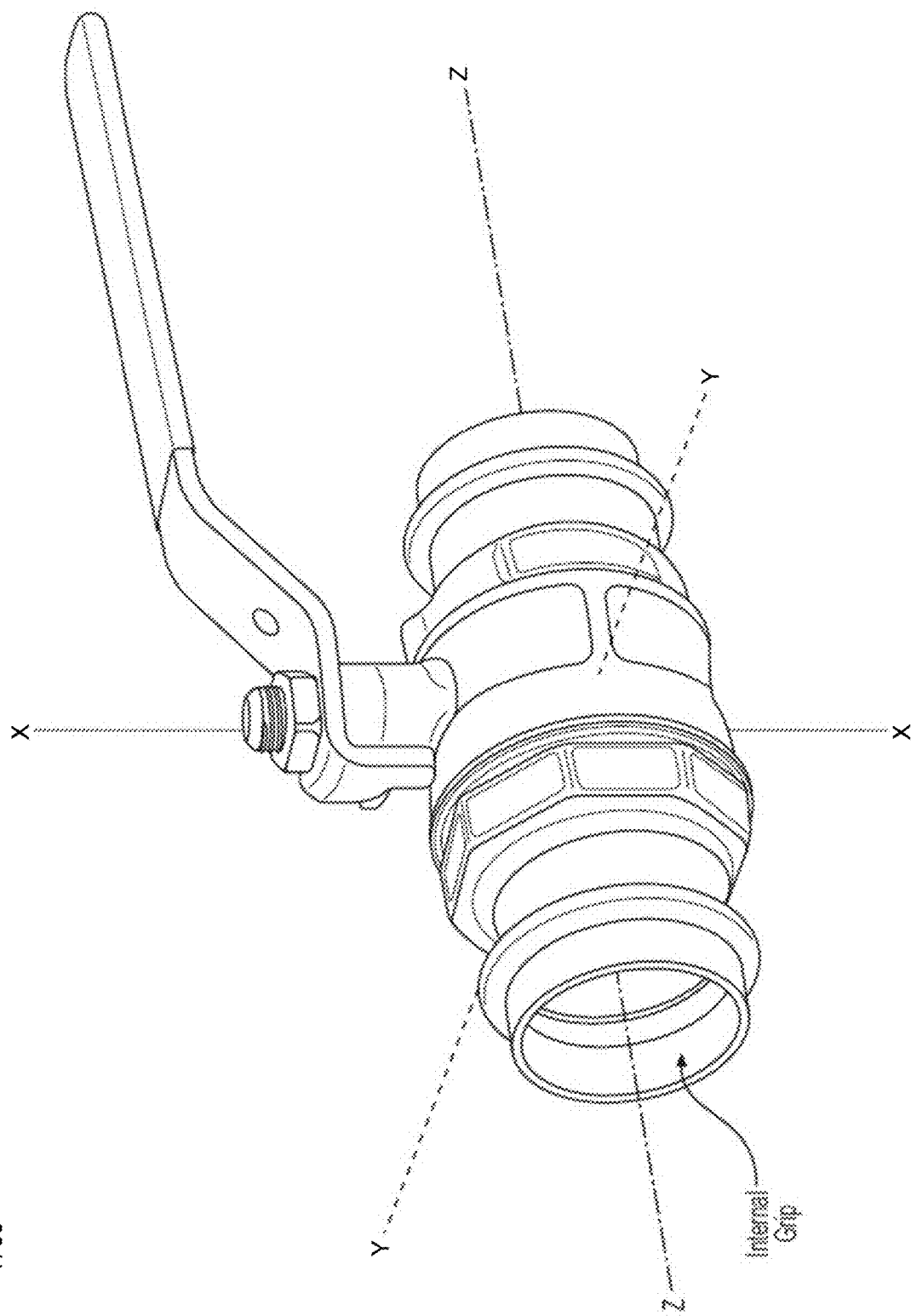
FIG. 17 shows an example of an asymmetrical workpiece having a symmetrical pick feature according to embodiments of the present disclosure.

Referring now to FIG. 17, an embodiment depicting an asymmetrical workpiece with a symmetrical pick feature is provided. Independent of the workpiece itself, it should be noted that the pick or place feature of a workpiece may have its own, separate symmetry. For example, the workpiece shown in FIG. 17 is asymmetrical, i.e., it has no rotational symmetry around any of the axes. Moreover, for this particular workpiece there is no axis in any frame for which the workpiece would be rotationally symmetric. In this example, the workpiece has one possible pick feature shown as an internal grip on the left side. Even though the workpiece is asymmetrical, this pick feature has rotational symmetry around the (z) axis.

Figure 18:
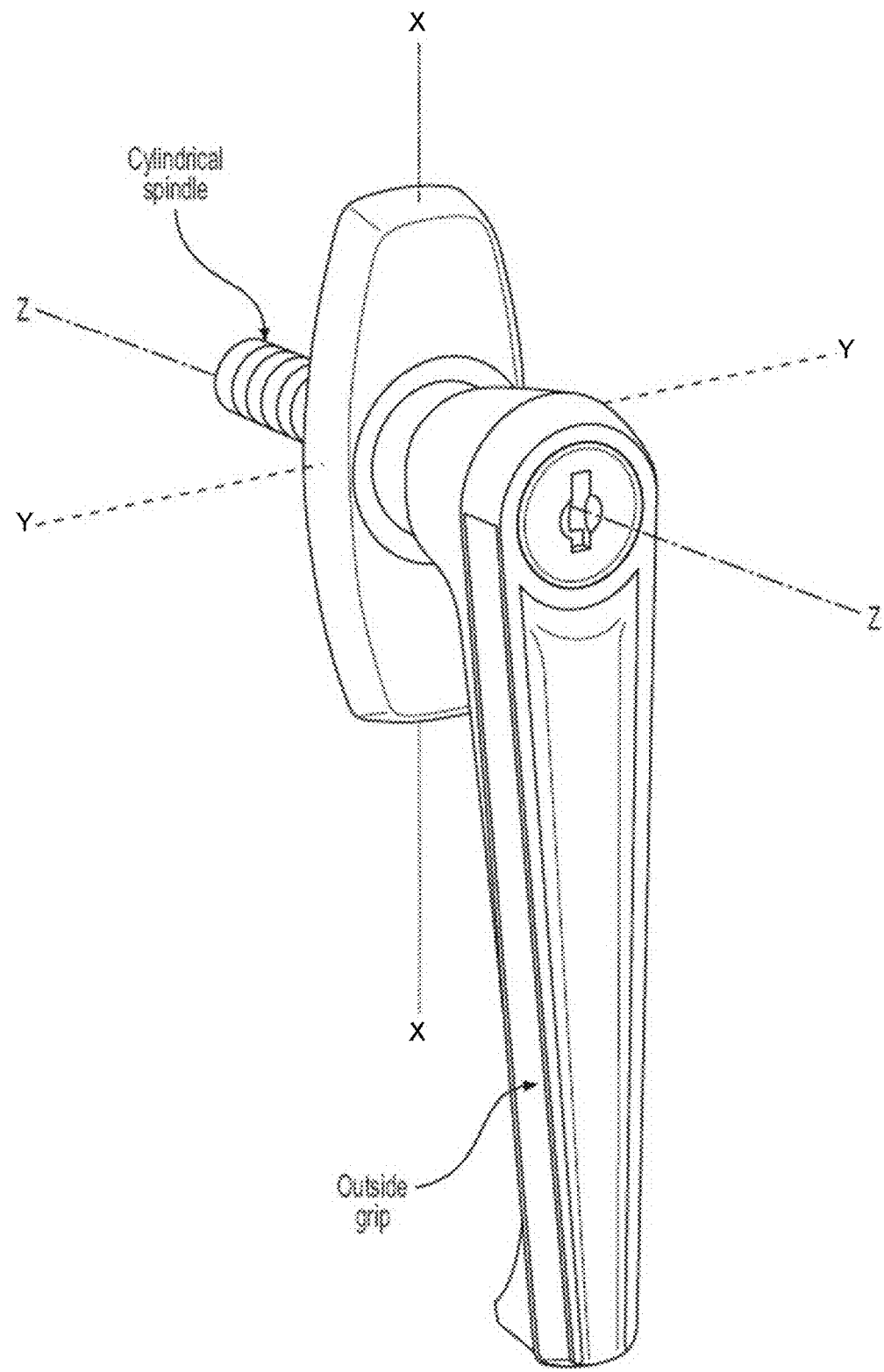
FIG. 18 shows an example of an asymmetrical workpiece having a symmetrical place feature according to embodiments of the present disclosure.

Referring now to FIG. 18, an embodiment depicting an asymmetrical workpiece with a symmetrical place feature is provided. The workpiece in FIG. 18 is asymmetrical, i.e., it has no rotational symmetry around any possible axis. In this example, it has one asymmetrical pick feature, namely an outside grip along the tapered sides of the handle. However, it should be noted that this example does include a symmetrical place feature, namely, a placement of the cylindrical spindle, in to a chuck. The place feature has rotational symmetry around the (z) axis.

Figure 19:
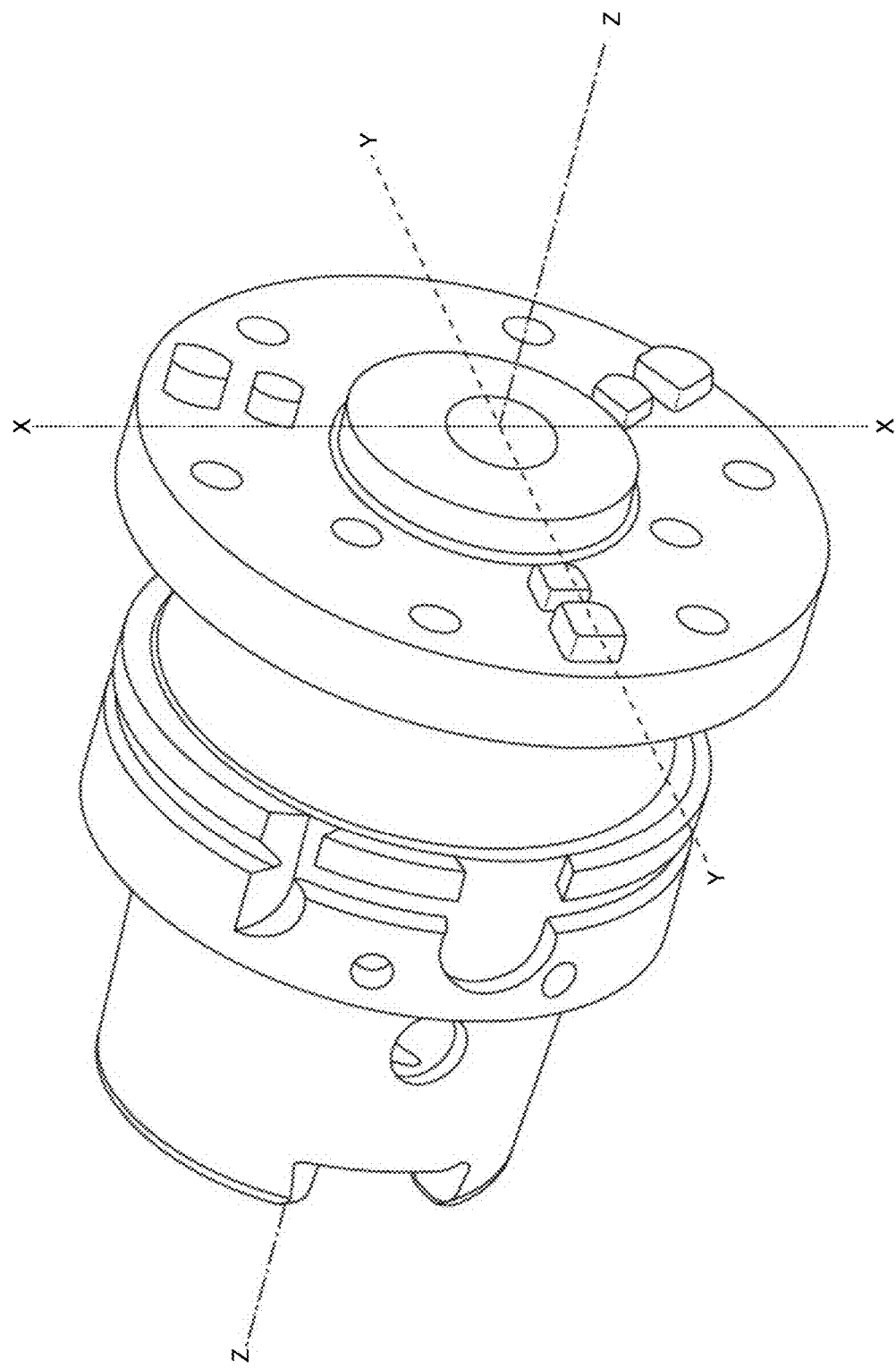
FIG. 19 shows an example of a place target with a symmetrical place feature according to embodiments of the present disclosure.

Referring now to FIG. 19, an embodiment depicting a place target with a symmetrical place feature is provided. The place target may have its own symmetry. For example, a chuck may have rotational symmetry around its axis of rotation. Or a fixture may have symmetry around an axis normal to its surface. To take advantage of this symmetry, embodiments included herein may be configured to establish a coordinate frame with the place target. Some options may include, but are not limited to, giving the place target its own coordinate frame (e.g. defining a feature for the place target, treating the place target like the end effector having a CAD-based coordinate frame of its own, etc.), using the coordinate frame of the workpiece pose when teaching the place, etc. For example, assuming that the user correctly aligns the workpiece and the target when teaching the place, the two coordinate frames may each be the same at the point of placement. In some embodiments, it should be noted that there may be more than one place target associated with a particular robot task or series of tasks.

Figure 20:
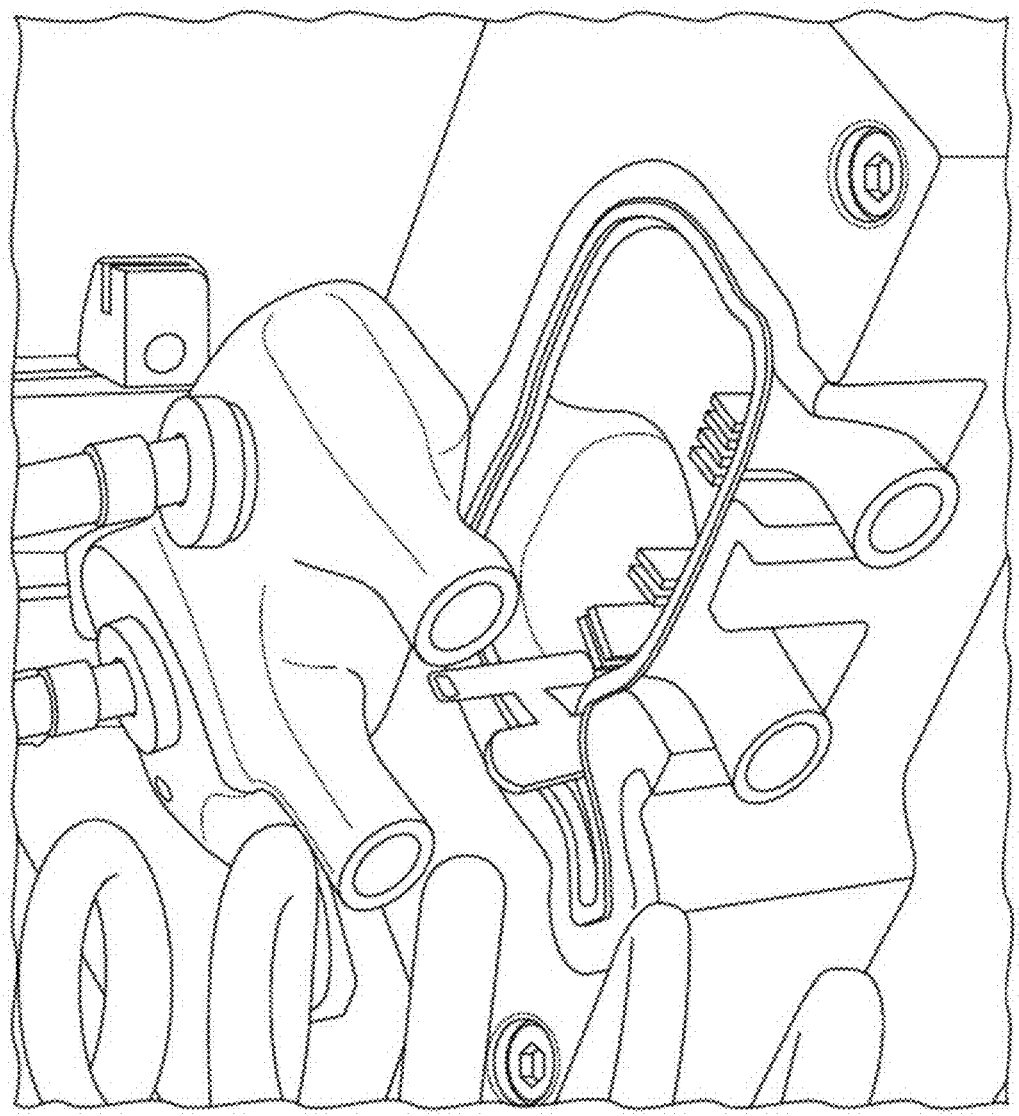
FIG. 20 shows an example of an asymmetrical place target according to embodiments of the present disclosure.
Figure 21:
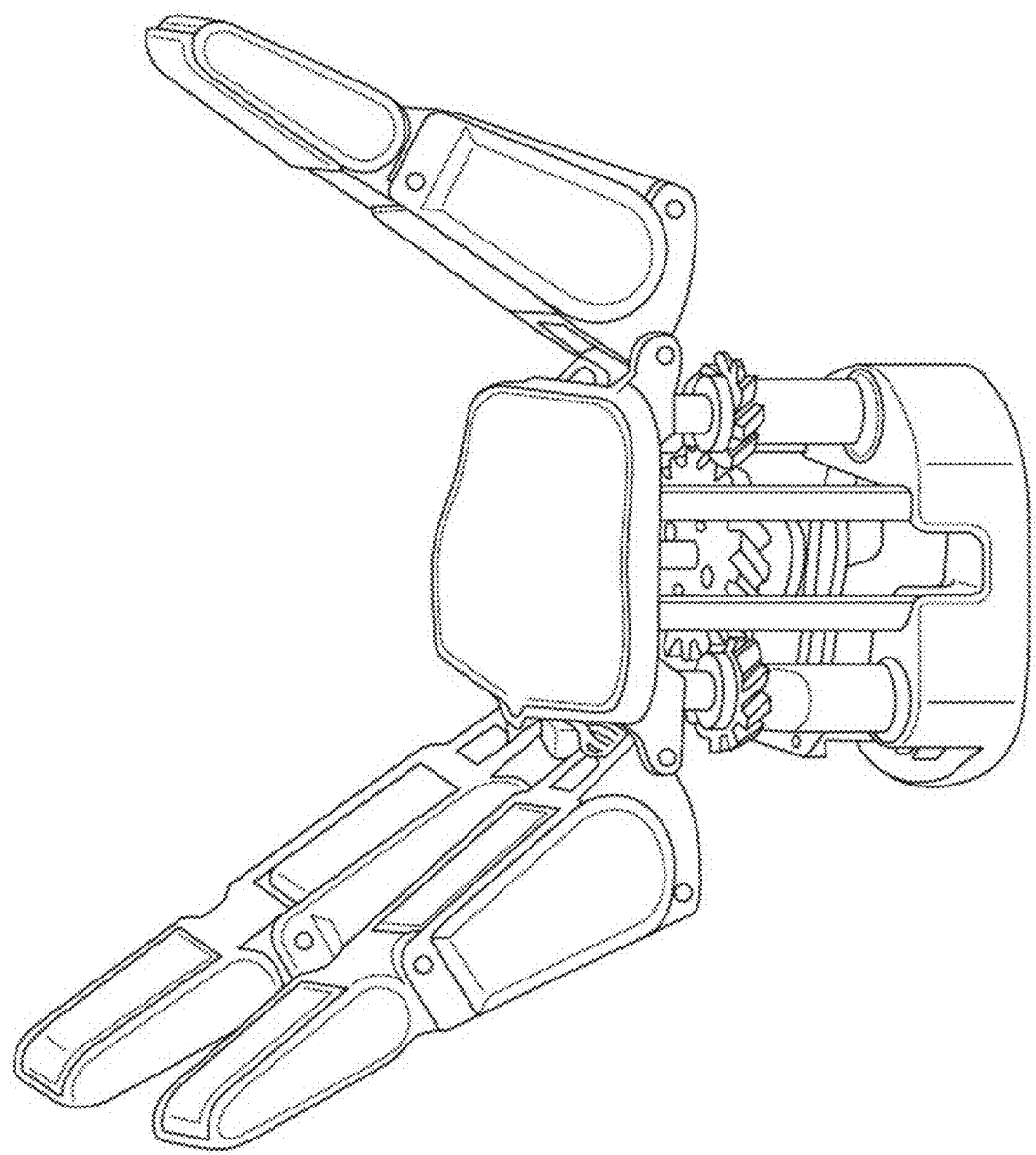
FIG. 21 shows an example of an asymmetrical end effector according to embodiments of the present disclosure.
Figure 22:
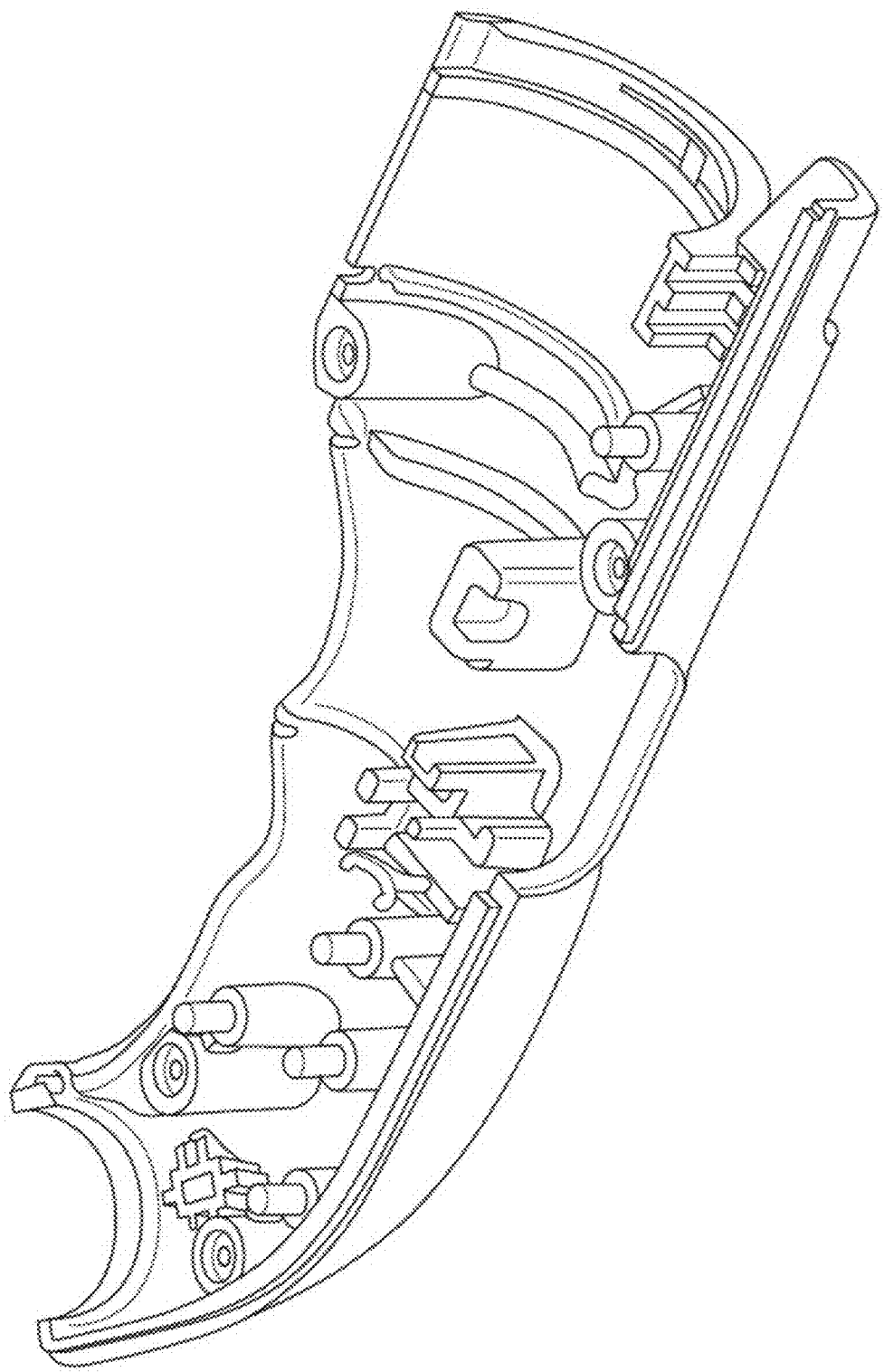
FIG. 22 shows an example of an asymmetrical workpiece with asymmetrical pick features according to embodiments of the present disclosure.
Figure 23:
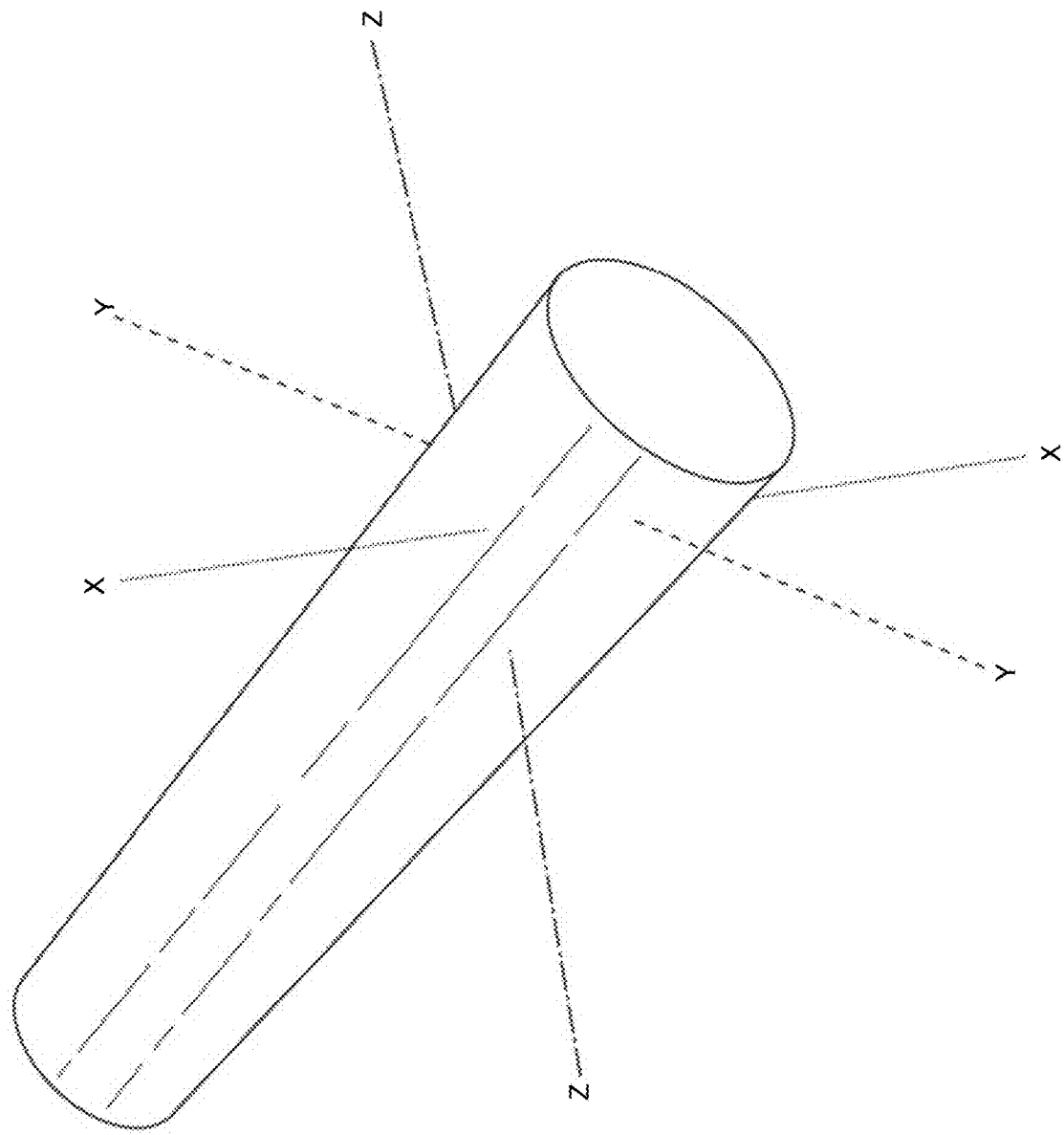
FIG. 23 shows an example of a workpiece having no pick or place features with symmetry around the x, y, or z axis according to embodiments of the present disclosure.

Referring now to FIGS. 20-22, embodiments depicting asymmetrical examples are provided. In some embodiments, an asymmetry may be the programming default. When there is asymmetry, there are no two pick or place features that are identical, and no two end effector positions (while holding the workpiece) that are identical. FIG. 20 shows an asymmetrical place target, FIG. 21 shows an asymmetrical end effector, and FIG. 22 shows an asymmetrical workpiece with asymmetrical workpiece features. It should be noted that the workpiece in FIG. 22 does have some possible symmetrical pick and place features, for example, the round screw holes and the cylindrical pegs exhibit symmetry. If none of these are used as pick or place features, the workpiece picking and placing may be considered asymmetrical. It may also be possible to treat a symmetrical workpiece as asymmetrical. In some embodiments, this may be the programming default. In this case, the system may select one of the infinite poses the symmetrical workpiece could have, and the control software may attempt to determine a path to the pick features allowed for that pose, even if other identical pick features are available. This may limit picking and path planning performance. In some embodiments, a workpiece with symmetry around an axis other than the x, y, or z axis of the associated frame may be treated as asymmetrical. This may indicate that the frame needs to be assigned properly to realize symmetries. FIG. 23 shows an example of a workpiece that has no pick or place features with symmetry around the x, y, or z axis and is therefore asymmetrical. For clarity, it should be noted that none of the axes shown in FIG. 23 pass through the center of any cross-section of the workpiece along the longest dimension of the workpiece.

Figure 25:
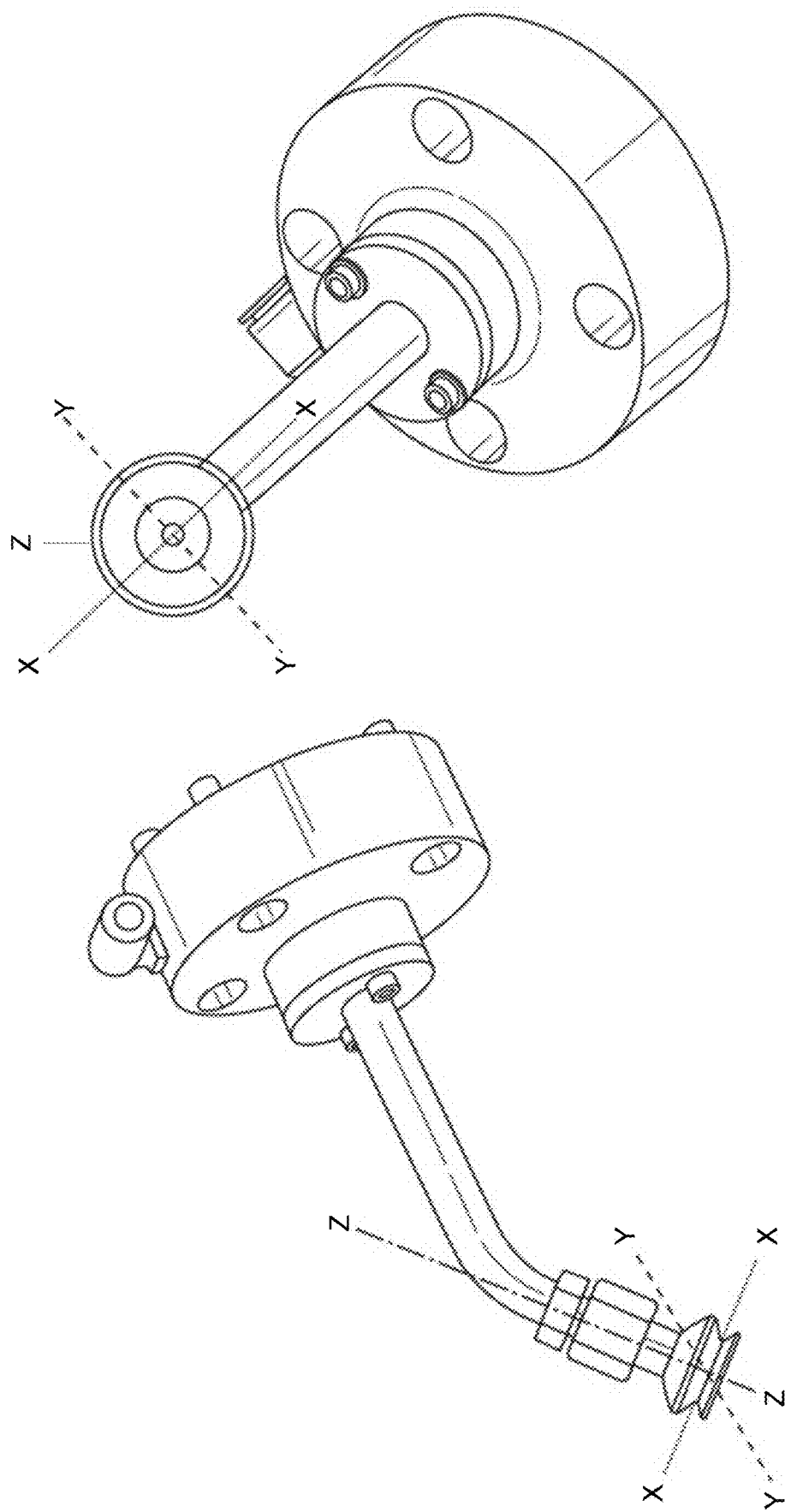
FIG. 25 shows an example of an end effector according to embodiments of the present disclosure.

Referring now to FIGS. 24-25, embodiments depicting continuous symmetry examples are provided. As discussed above, continuous symmetry may indicate that a pick or place feature may be rotated any increment over a range of 360° around its x, y, or z axis with no change in its appearance. It should be noted that this may be the case for the pick or place feature, not the workpiece or fixture as a whole. FIG. 24 shows an asymmetrical workpiece with two possible pick features at each end, each of which may be continuously symmetrical around the (x) axis passing through the center of each pick feature. For an end effector, this may indicate that the end effector may be rotated by any increment over a range of 360° around an axis, with no change in its ability to pick or place the workpiece. In some embodiments, the convention is to assign this as the z axis for the end effector, however the x or y axis may also be used. FIG. 25 shows an end effector with continuous symmetry around an axis perpendicular to the center of the contact point.

Figure 27:
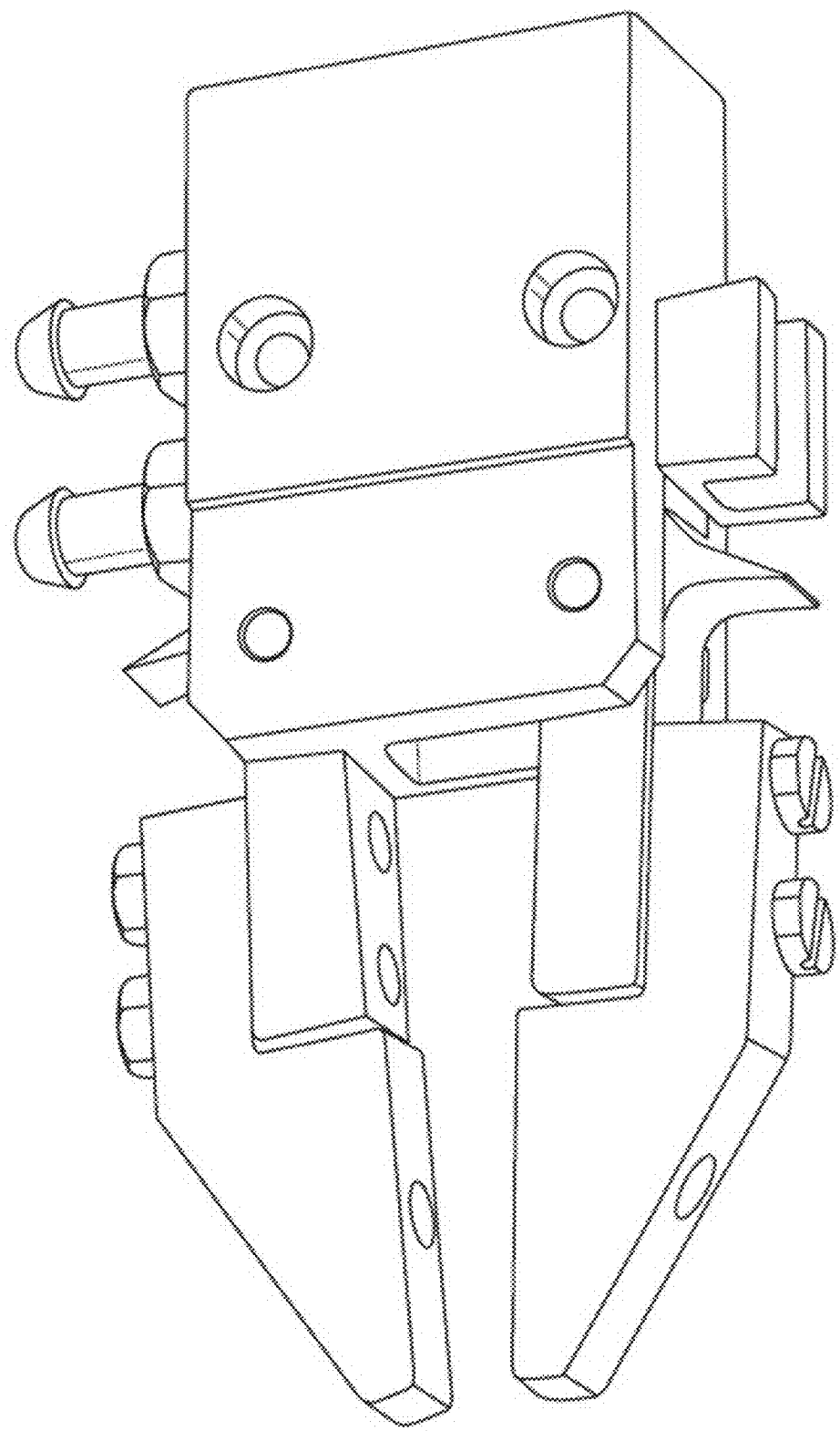
FIG. 27 shows an example of an end effector according to embodiments of the present disclosure.
Figure 28:
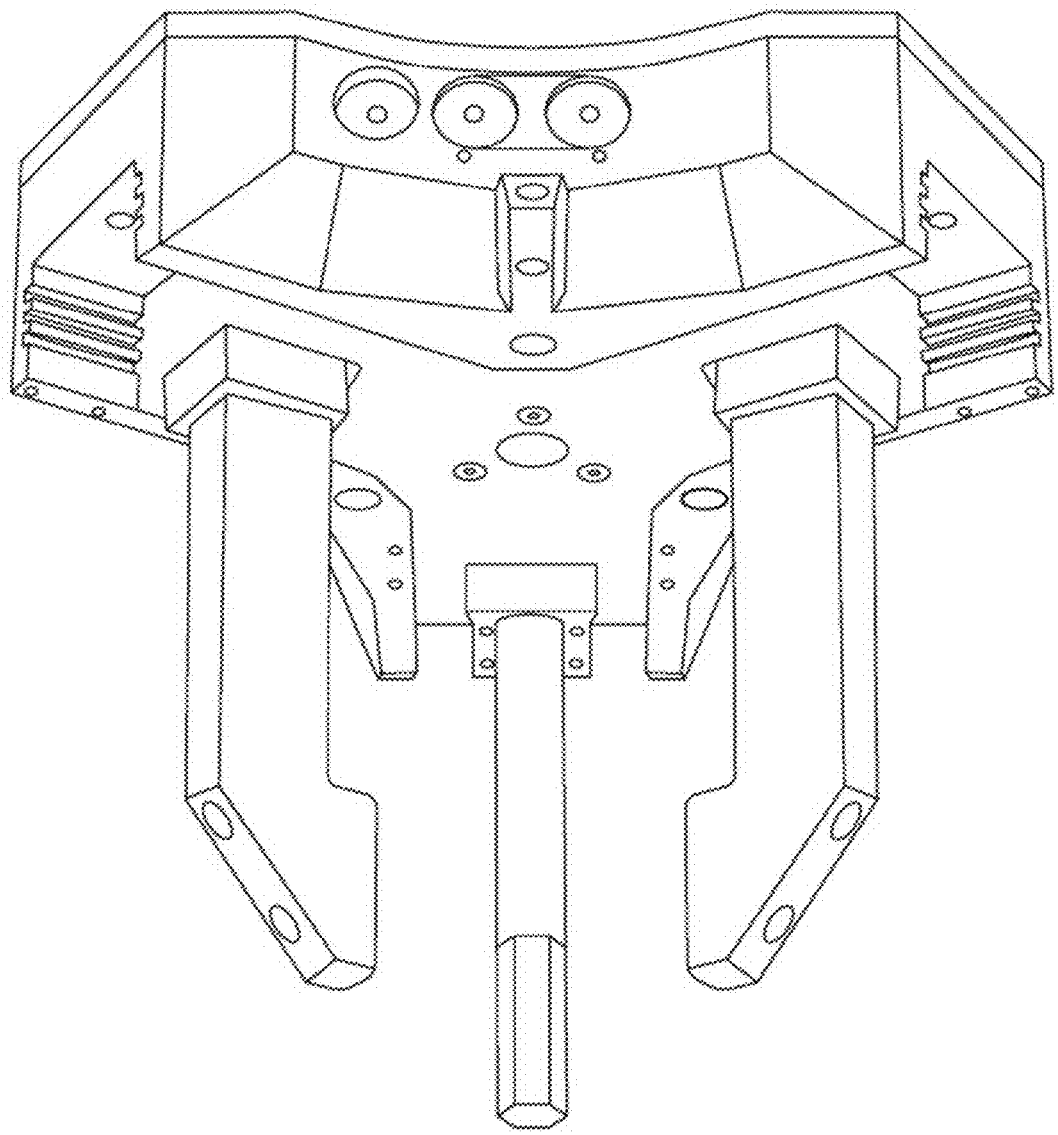
FIG. 28 shows an example of an end effector according to embodiments of the present disclosure.
Figure 29:
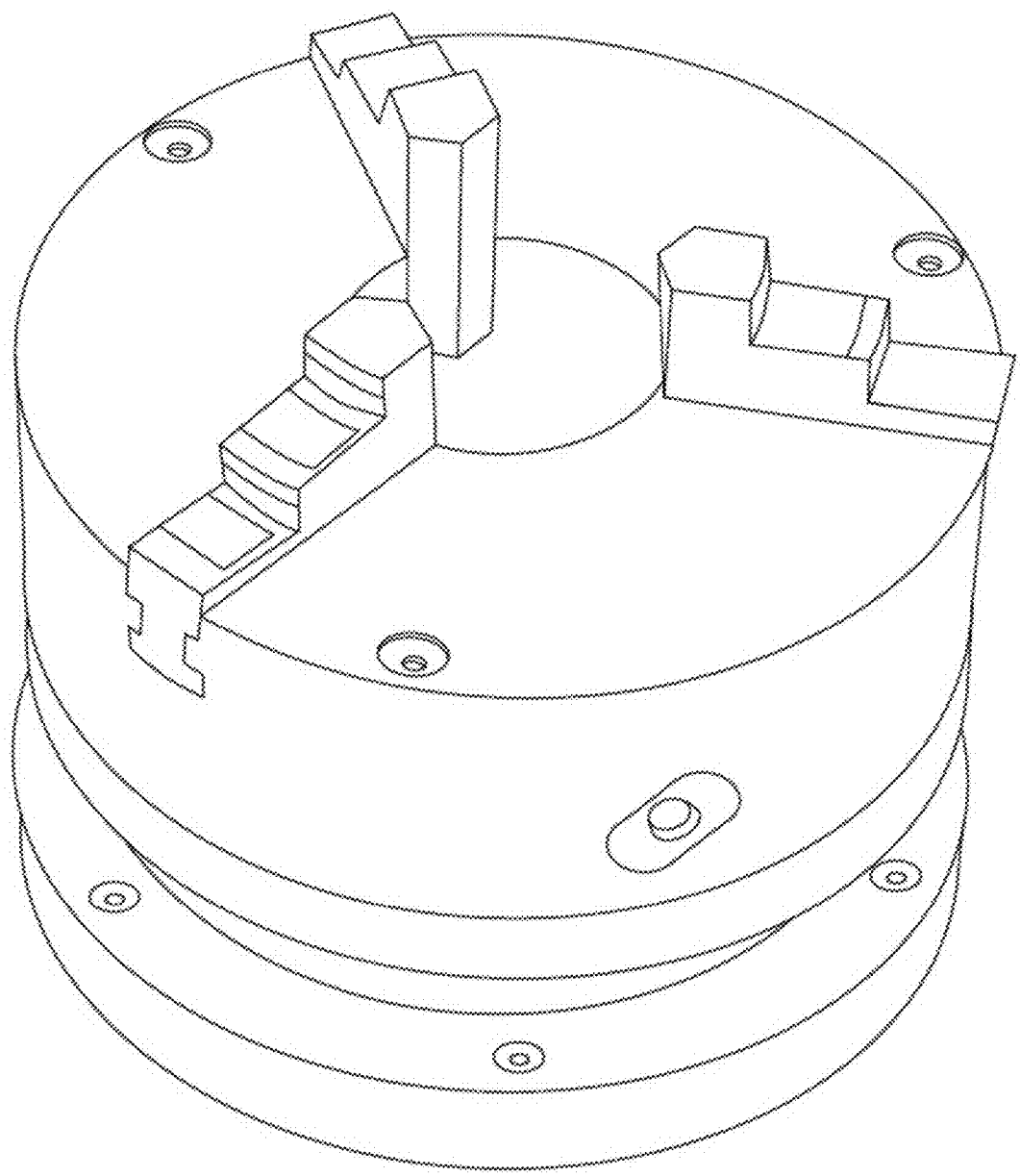
FIG. 29 shows an example of a place target according to embodiments of the present disclosure.
Figure 30:
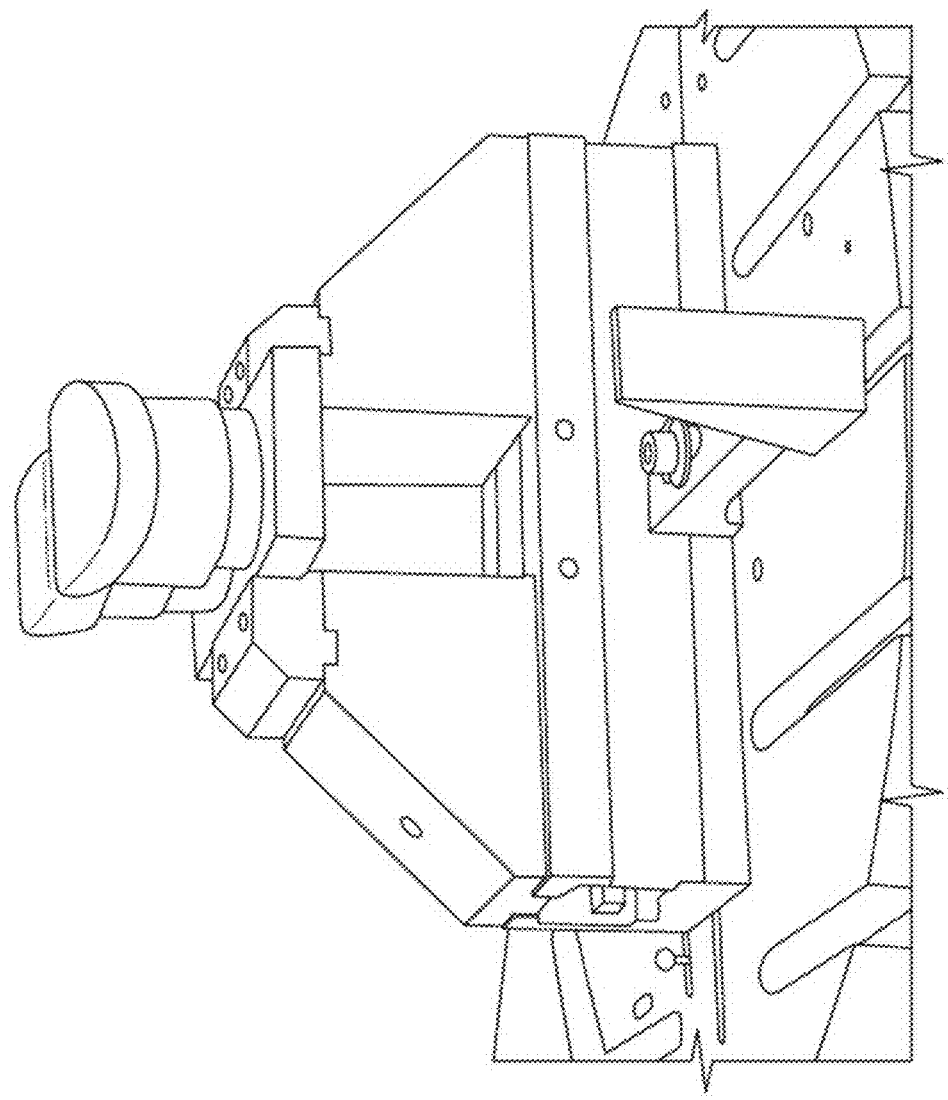
FIG. 30 shows an example of a place target according to embodiments of the present disclosure.

Referring now to FIGS. 26-29, embodiments depicting discrete symmetry examples are provided. Discrete symmetry indicates that a pick or place feature, or an end effector, may be rotated 360° in at least two discrete increments around its x, y, or z axis with no change in the function of the feature for purposes of picking or placing the workpiece. It should be noted that this example is illustrates the pick or place feature, not the workpiece or fixture as a whole. In FIG. 26, for example, a pick taught as an outside grip may have discrete symmetry while a pick taught as an inside grip may have continuous symmetry. In some embodiments, the increment may be specified as a number of increments, as degrees, or using any suitable approach. For example, a pick feature having three discrete increments of symmetry can also be described as having 360°/3=120° discrete symmetry. FIG. 27 shows an example end effector with 180° discrete symmetry. FIG. 28 shows an example end effector with 120° discrete symmetry. FIG. 29 shows a place target (CNC chuck) with 120° discrete symmetry. FIG. 30 shows a place target (CNC vise) with 180° discrete symmetry.

Figure 31:
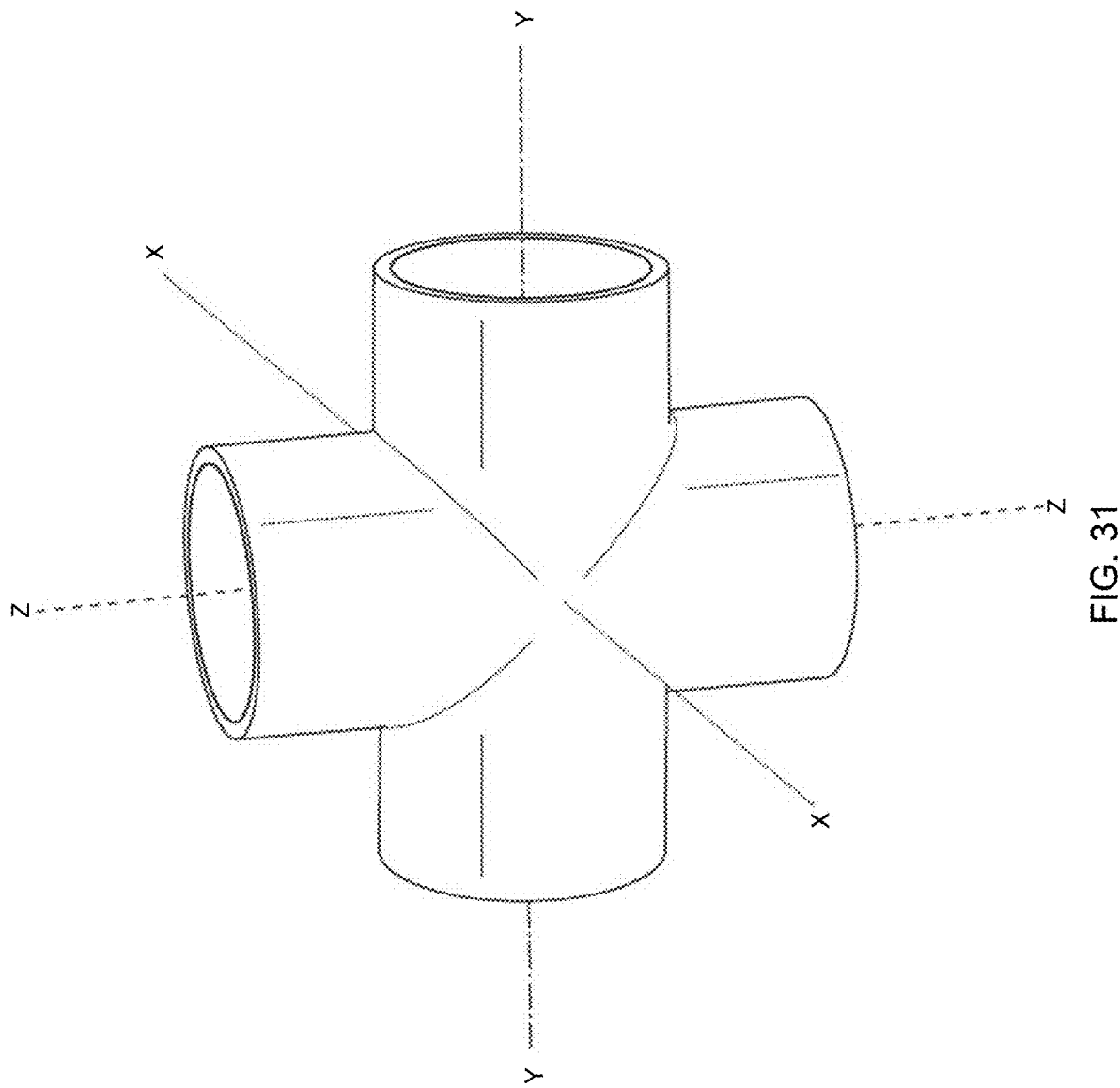
FIG. 31 shows an example of a workpiece according to embodiments of the present disclosure.

Referring now to FIG. 31, an embodiment depicting workpiece symmetry around x, y, and z axes is provided. In order to align end effectors, workpieces, and place targets with discrete symmetry, the starting point or zero angle of the discrete symmetry may need to be determined. For example, if the coordinate frame of the place target may be inferred from the taught workpiece pose, the zero angle may be inferred from the relative positions of the workpiece and the place target. Alternatively, if a coordinate frame were to be explicitly assigned to the place target, the user may need to specify one of the other two axes as the zero angle. In some embodiments, the system may allow for a symmetry definition around more than one axis. FIG. 31 shows a workpiece with six possible pick features. Namely, two internal grips with continuous symmetry around the z axis, two internal grips with continuous symmetry around the y axis, and two external suction picks with 90° discrete symmetry around the x axis (both sides of the workpiece). In the case of discrete symmetry around the x axis, the system may require specification of which axis sets the zero angle of pick symmetry around the x axis. In this particular example, it could be either the y or the z axis.

Figure 32:
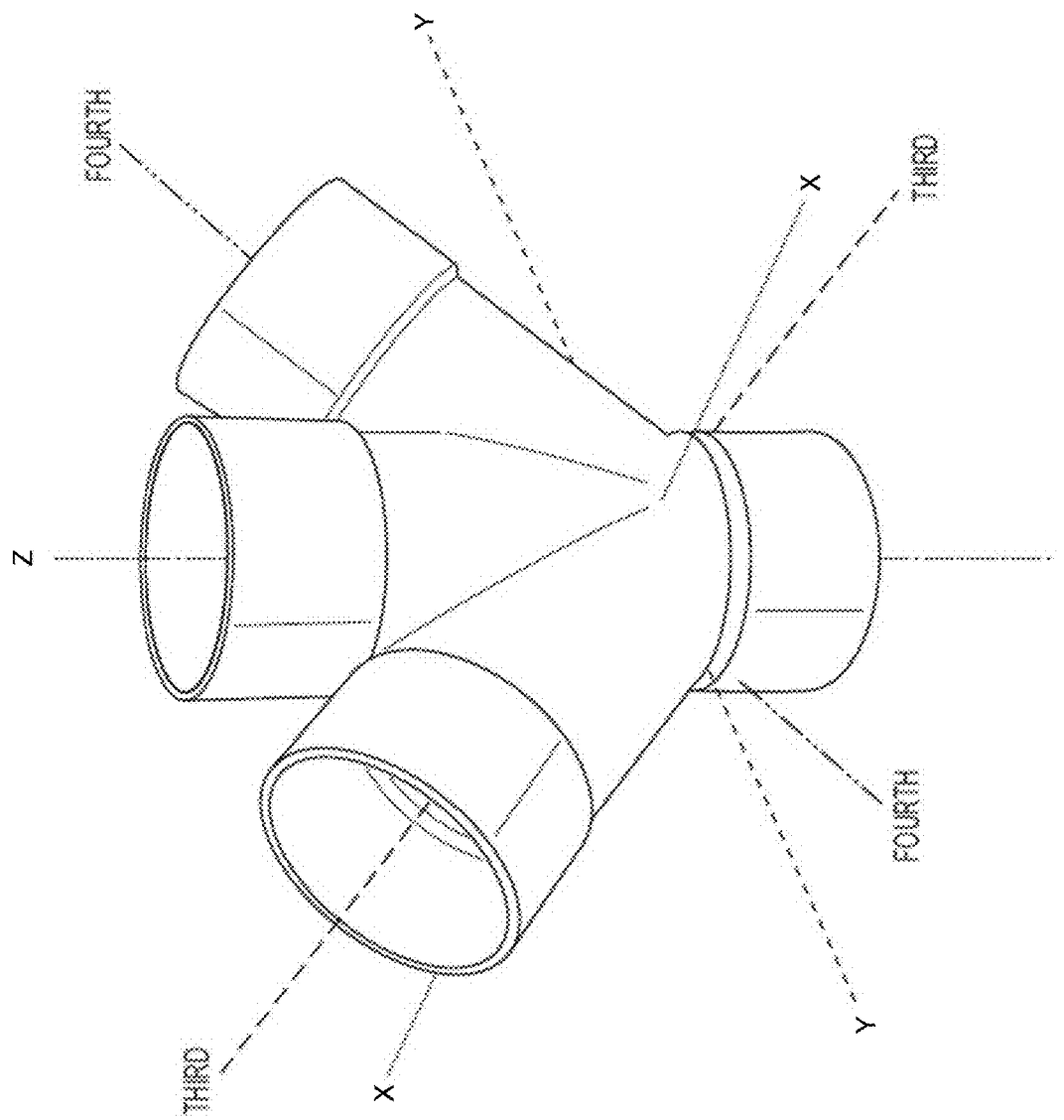
FIG. 32 shows an example of a workpiece according to embodiments of the present disclosure.

Referring now to FIG. 32, an embodiment showing an example with non-orthogonal axes is provided. Some workpieces have pick and place features that may be symmetrical around multiple axes, however the axes are not orthogonal to each other. For example, the workpiece in FIG. 32 includes a first internal grip, continuously symmetrical pick feature on the top, and a second internal grip, continuously symmetrical place feature on the bottom (not visible). It also has a third pick feature, relative to a third axis, and a fourth pick feature, relative to a fourth axis. Since the system may generally only allow specification of symmetry around the x, y, or z axis in the workpiece frame, the third and fourth pick features may be considered asymmetrical. The system may still allow the user to specify pick features at this point, but they may have only one possible end effector position, owing to the lack of symmetry around one of the x, y, or z axis. Disallowing nonorthogonal axes of symmetry actually creates very few problems as it is fairly uncommon. If the end effector has symmetry, that is sufficient to allow unconstrained picks, without the need for workpiece pick feature symmetry (see FIG. 33). It is rather unlikely to have workpiece pick feature symmetry with an asymmetrical end effector, but even if this occurs, the workaround of programming multiple picks for the un-aligned axes is still possible.

In some embodiments, the system may be configured to calculate motion constraints from symmetry information. The unconstrained motion may be easily calculated by examining the following combinations: the workpiece pick feature and the end effector and the workpiece place feature and the place target place feature. This all assumes an unconstrained environment as there may be further rules when the environment is constrained. The preferred rule is to operate according to the lowest constraint. For example, if an end effector has continuous symmetry around its z axis, and the pick feature is asymmetrical, the system may take advantage of the less constrained feature, the continuous symmetry of the end effector around its z axis, and allow the picking of the part using any valid end effector pose that varies only in the rotation around the end effector z axis. Allowing this freedom of end effector pose essentially allows unconstrained robot motion in one of the end effector axes, here in end effector z. Alternatively, if an end effector has 180° discrete symmetry around its z axis, and the pick feature has continuous symmetry around the workpiece x axis, this system may take advantage of the less constrained feature, the continuous symmetry of the pick feature around the workpiece x axis, and allow the picking of the part using any valid end effector pose that varies only in the end effector rotation around the workpiece x axis. Allowing this freedom of end effector pose may be known as free spin in workpiece x. If the workpiece place feature has 120° discrete symmetry around the associated workpiece axis, and the place target place feature has 60° discrete symmetry around the associated place target axis, the system may take advantage of the less constrained feature, the 60° discrete place target symmetry (the smaller of the two angles), and allow placing the part using any valid end effector pose in 60° increments of rotation around the place target reference axis. Allowing this freedom of end effector pose may be known as discrete spin around the place target reference axis x. In this example, the workpiece coordinate frame and the place target coordinate frame may need to be aligned to the same zero angle. Some possible rules examples are provided in FIGS. 33-34.

Figure 35:
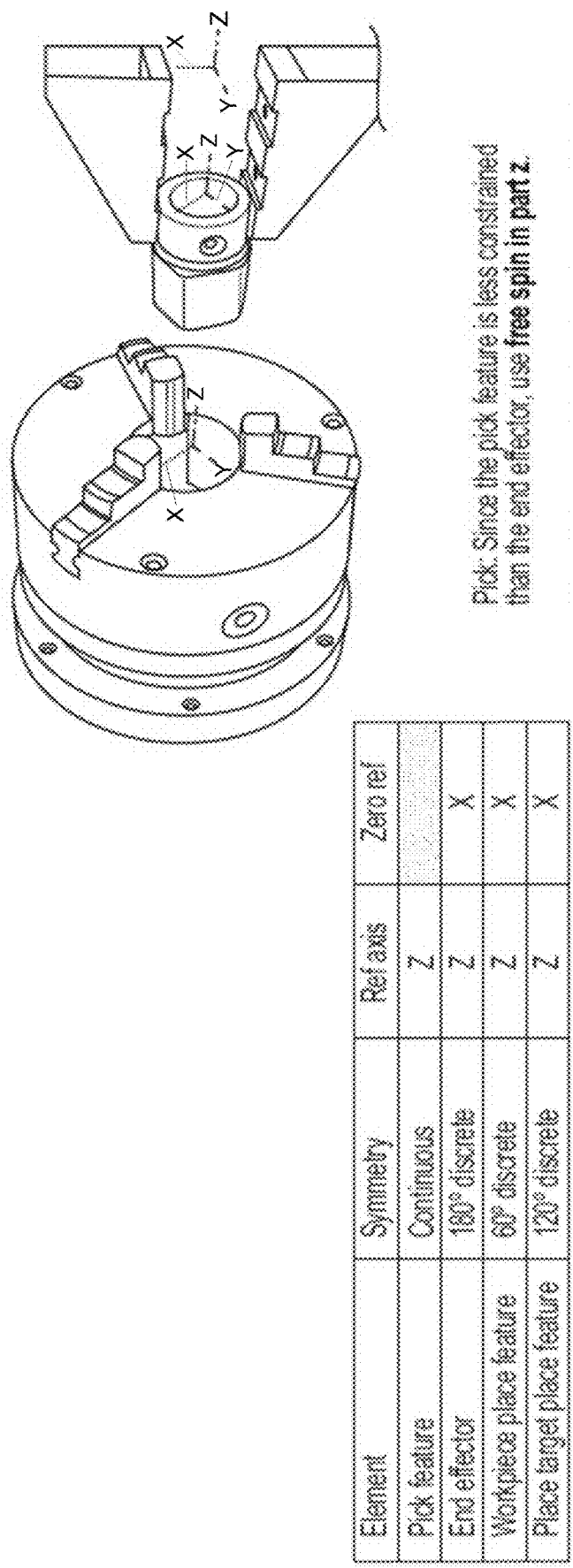
FIG. 35 shows an example of a workpiece being placed at a place target according to embodiments of the present disclosure.

Referring now to FIGS. 35-40, embodiments of the present disclosure providing examples of workpieces are provided. FIG. 35 shows an example workpiece made from hex stock, placed in to chuck, z aligned. For picking the workpiece, since the workpiece pick feature is less constrained than the end effector, use free spin in workpiece z. For placing the workpiece, the lesser of the two discrete symmetries is 60° for the workpiece, such that the place may be in any 60° increment. Note, the workpiece and place target zero reference axes are aligned. FIG. 36 shows the same workpiece but with the end effector and workpiece z axes unaligned. This is similar to the example above, however, the pick position may be taught differently, with a grip from the side. For picking the workpiece, since the workpiece pick feature is less constrained than the end effector, use free spin in workpiece z. For placing the workpiece, the lesser of the two discrete symmetries is 60° for the workpiece, such that the place can be in any 60° increment. It should be noted that the workpiece and place target zero reference axes are aligned. In this example, the end effector's z axis and the workpiece's z axis are no longer aligned. As such, the system may always explicitly specify the free spin is around workpiece z, and does not assume alignment with end effector center point (TCP) z. It is possible to artificially align the workpiece and end effector z, but this may then limit the pick to one TCP. Alternatively, the user may specify and select from multiple TCPs. Embodiments included hereinbelow provide a number of GUIs and displays that may be configured to relieve the user of this burden (and of creating a more complex UI), which may allow for the calculation of its own temporary TCP based on the taught pick.

Figure 37:
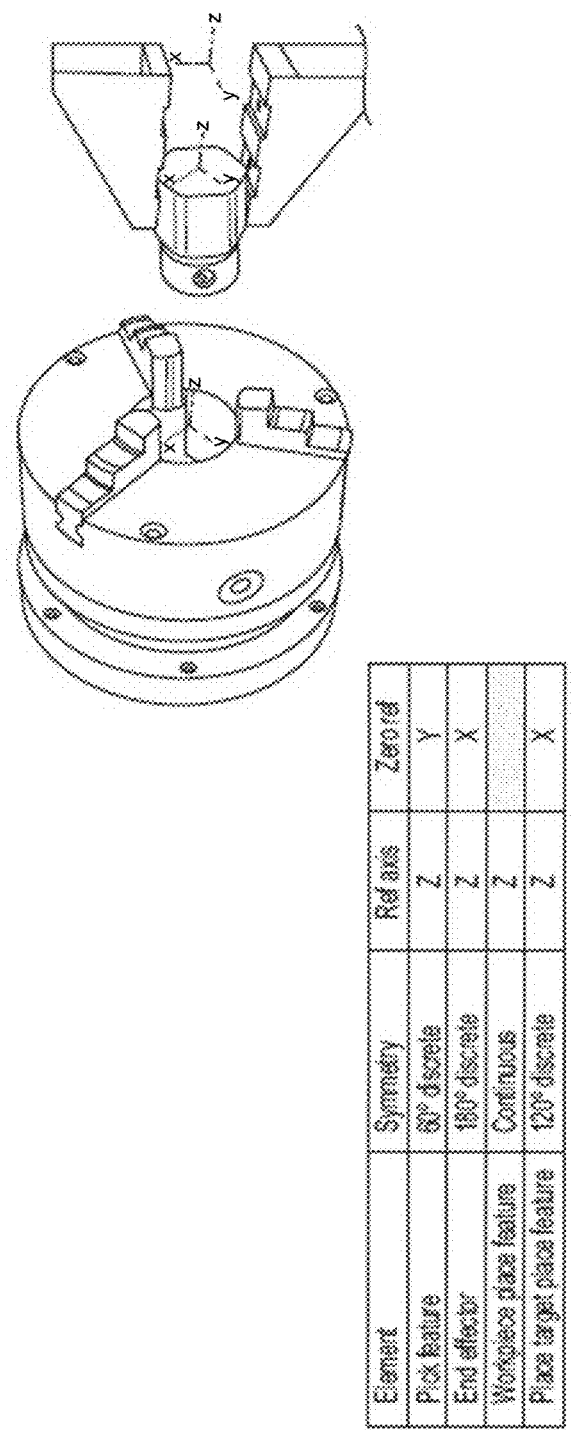
FIG. 37 shows an example of a workpiece being placed at a place target according to embodiments of the present disclosure.
Figure 38:
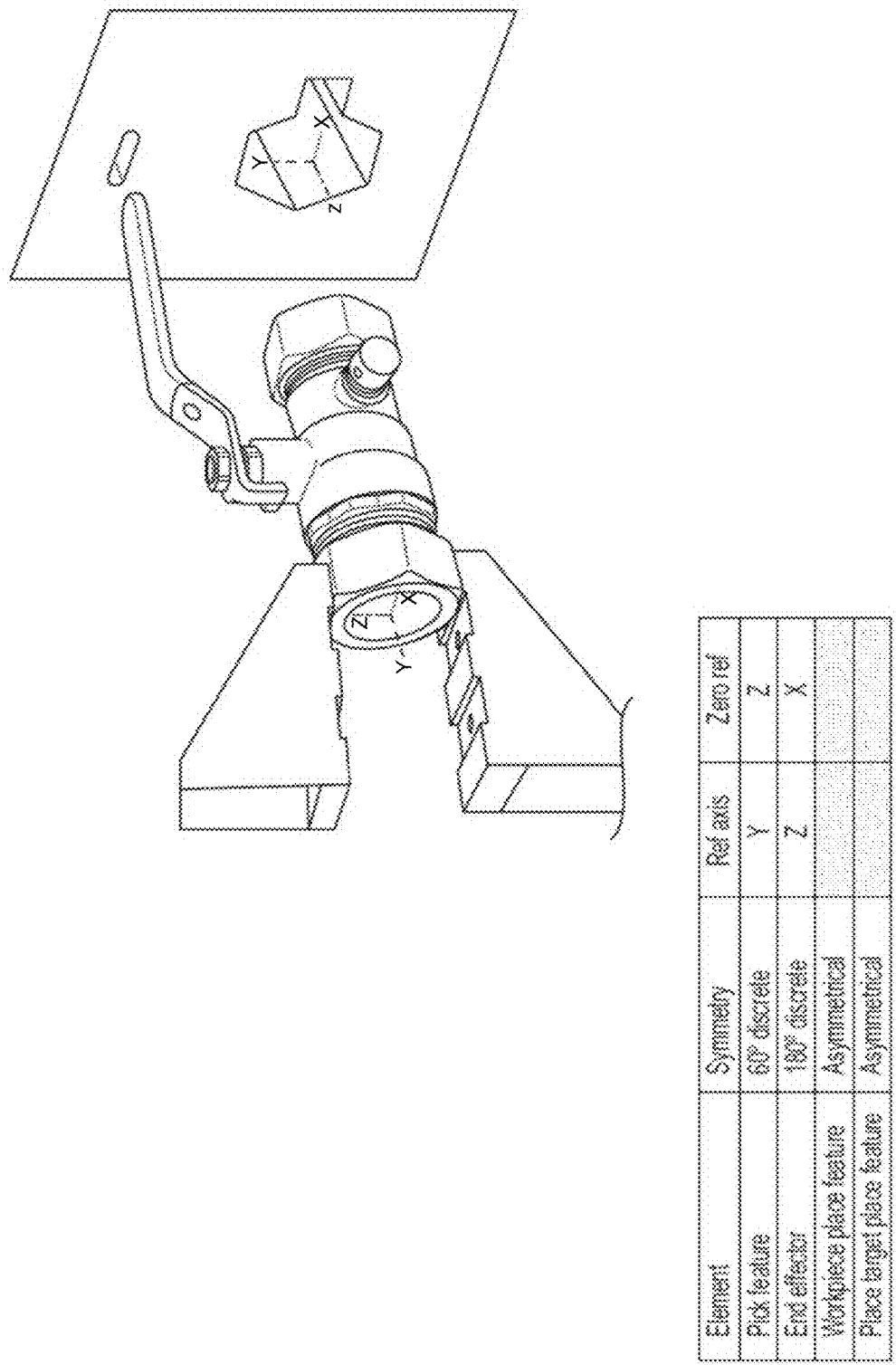
FIG. 38 shows an example of a workpiece being placed at a place target according to embodiments of the present disclosure.

Referring now to FIG. 37, an embodiment showing a point-to-point gripping end effector is provided. For picking the workpiece, rather than re-orienting the workpiece frame, the user has selected the y axis as the zero angle reference instead of x. Accordingly, the y axis lines up with the points rather than the flats of the hex stock. The lesser of the two discrete symmetries is 60° for the workpiece, so the pick may free spin in any 60° increment. In this example, the end effector's zero angle reference X axis may be rotated minus two (or plus four) 60° increments relative to the workpiece pick feature's zero angle reference Y. For placing the workpiece, since the workpiece place feature is less constrained than the place target, the place may use free spin in workpiece z. FIG. 38 shows an example of a workpiece with external asymmetry that must be placed in a specific asymmetrical location. For picking the workpiece, this is similar to above examples except the workpiece pick feature has discrete symmetry around the y axis and the zero angle may be set by the z axis. In this example, the gripper may be flat-to-flat. The lesser of the two discrete symmetries is 60° for the workpiece, so the pick can free spin in in any 60° increment. For placing the workpiece, since both the place feature on the workpiece (which includes the handle) and the place target are asymmetrical, there is only one valid place pose for the workpiece.

In some embodiments, all pick planning and motion constraints may be programmed as dialogues on the graphical user interface (e.g., Advanced tabs) for picking, placing, and the end effector. In some embodiments, the user may elect to specify anywhere from zero to all four of the symmetries. Every additional piece of information may improve performance, even when the others are left at the default (e.g., asymmetrical). In fact, when one of the two halves of the pick and place pairs (pick feature and end effector, or place feature and place target, place feature, respectively) have continuous symmetry, the other half of the pair's symmetry is irrelevant.

Figure 39:
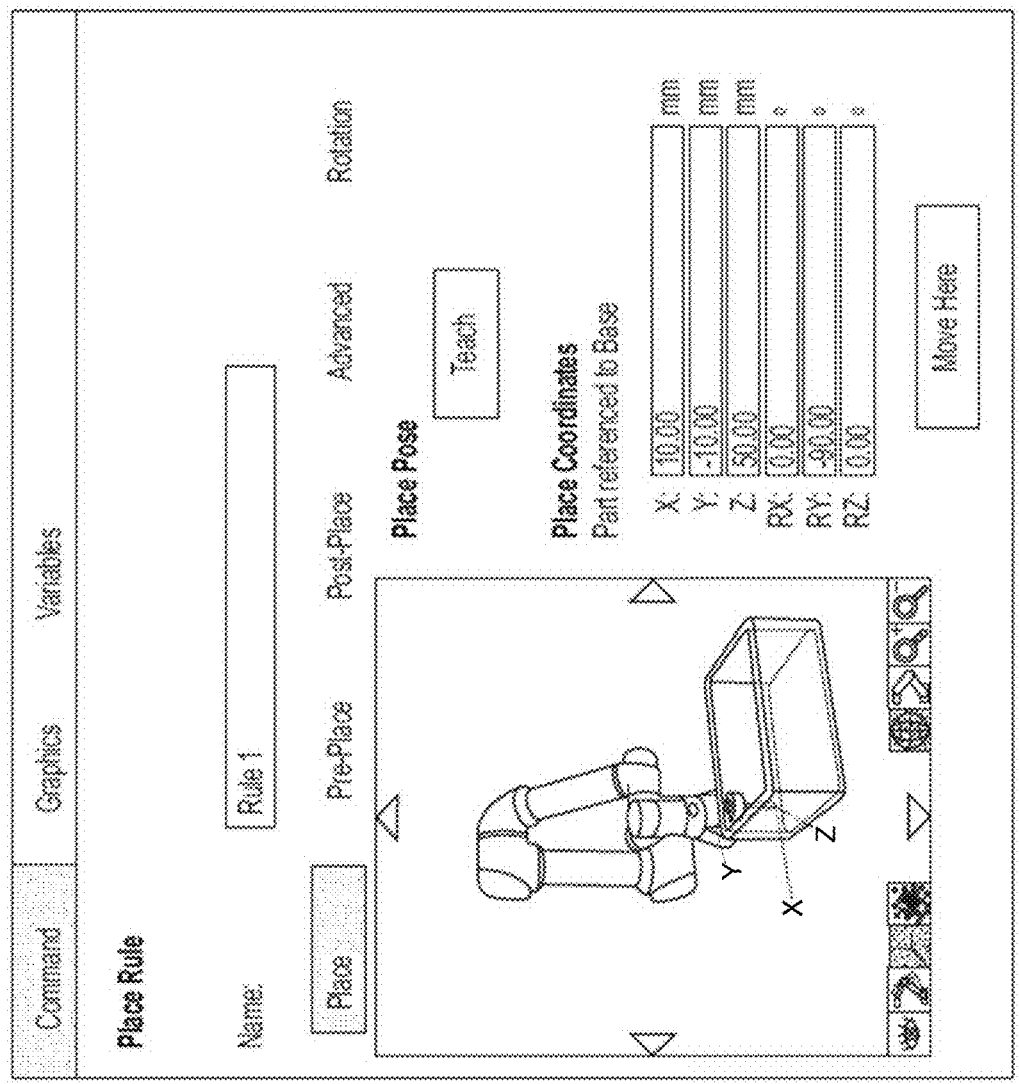
FIG. 39 is a graphical user interface of a robotic system, according to an embodiment of the present disclosure.

Referring now to FIG. 39, an embodiment showing an example graphical user interface 3900 consistent with the present disclosure is provided. GUI 3900 may allow for generating and displaying a place rule. In operation, upon user selection of the teach tab in GUI 3900 a place wizard may be generated.

Figure 40:
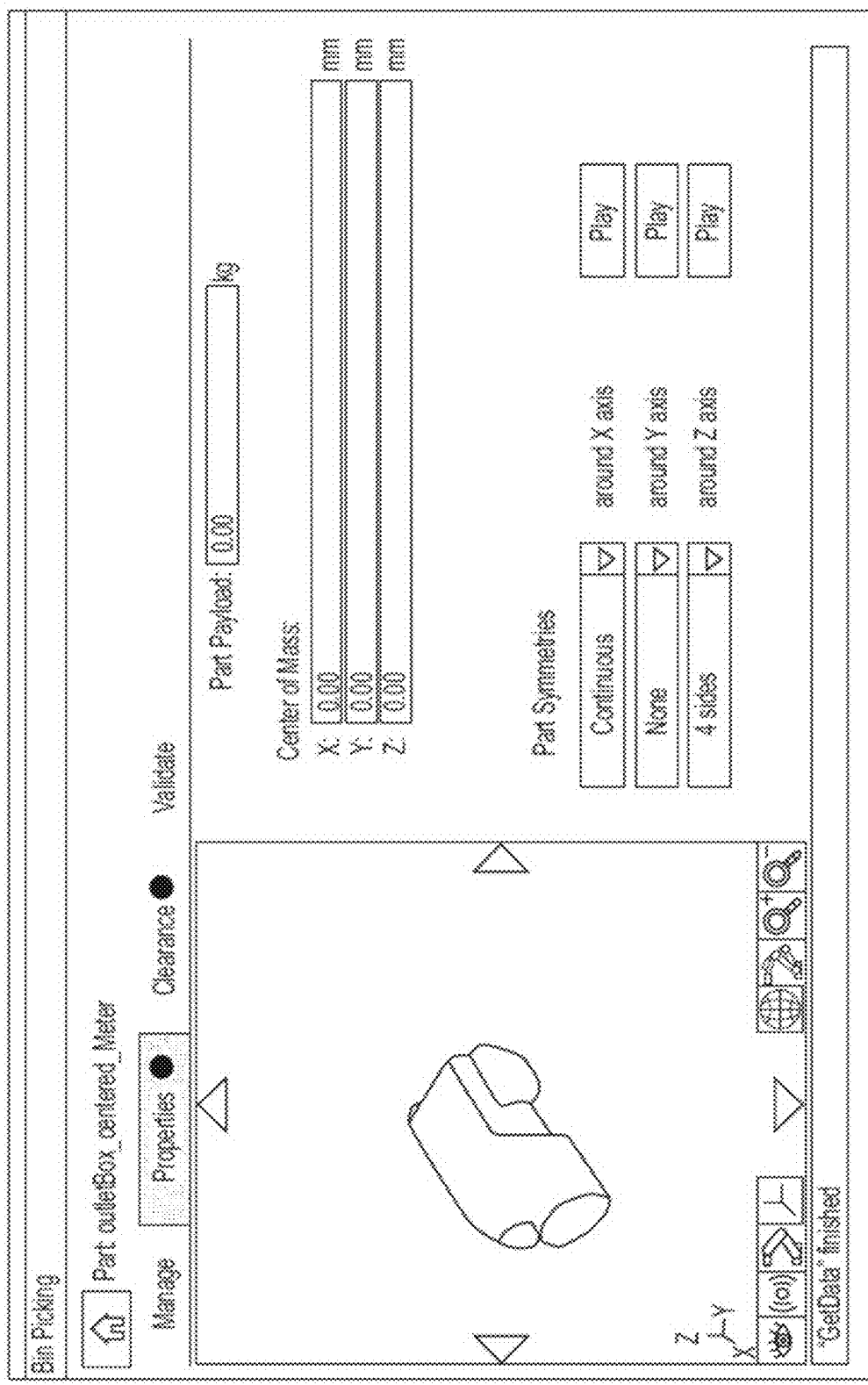
FIG. 40 is a graphical user interface of a robotic system, according to an embodiment of the present disclosure.

Referring now to FIG. 40, an embodiment showing an example graphical user interface 4000 consistent with the present disclosure is provided. GUI 4000 may allow for display of an installation tab for the workpiece. Defining workpiece pick and/or place symmetries allows for fewer pick rules and free spin workpiece Z on place. For example, the user may specify the type of symmetry that exists for each workpiece axis (e.g. none, continuous, or N sides, etc.).

Figure 41:
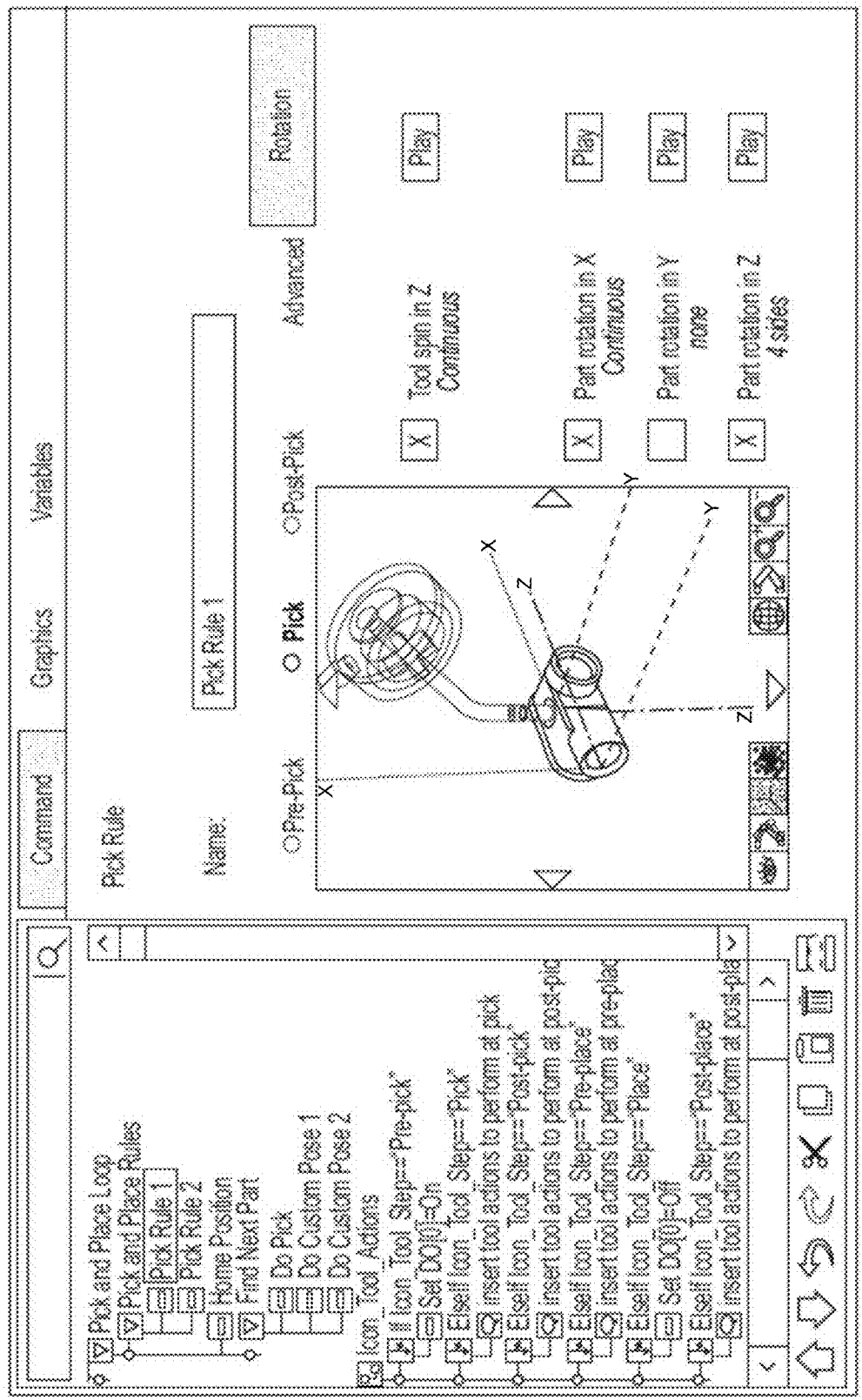
FIG. 41 is a graphical user interface of a robotic system, according to an embodiment of the present disclosure.

Referring now to FIG. 41, an embodiment showing an example graphical user interface 4100 consistent with the present disclosure is provided. GUI 4100 may display a pick rule rotation tab that may be configured to allow the user to visualize pick optimizations derived from end effector and workpiece symmetries by combining the end effector and the workpiece in the same view. As shown in the FIG. 41, any symmetries defined in the installation tab may be displayed and if a symmetry is not defined it may be de-emphasized (e.g. grayed out, etc.). In some embodiments, the user may override the use of any symmetry for a specific place rule.

Figure 42:
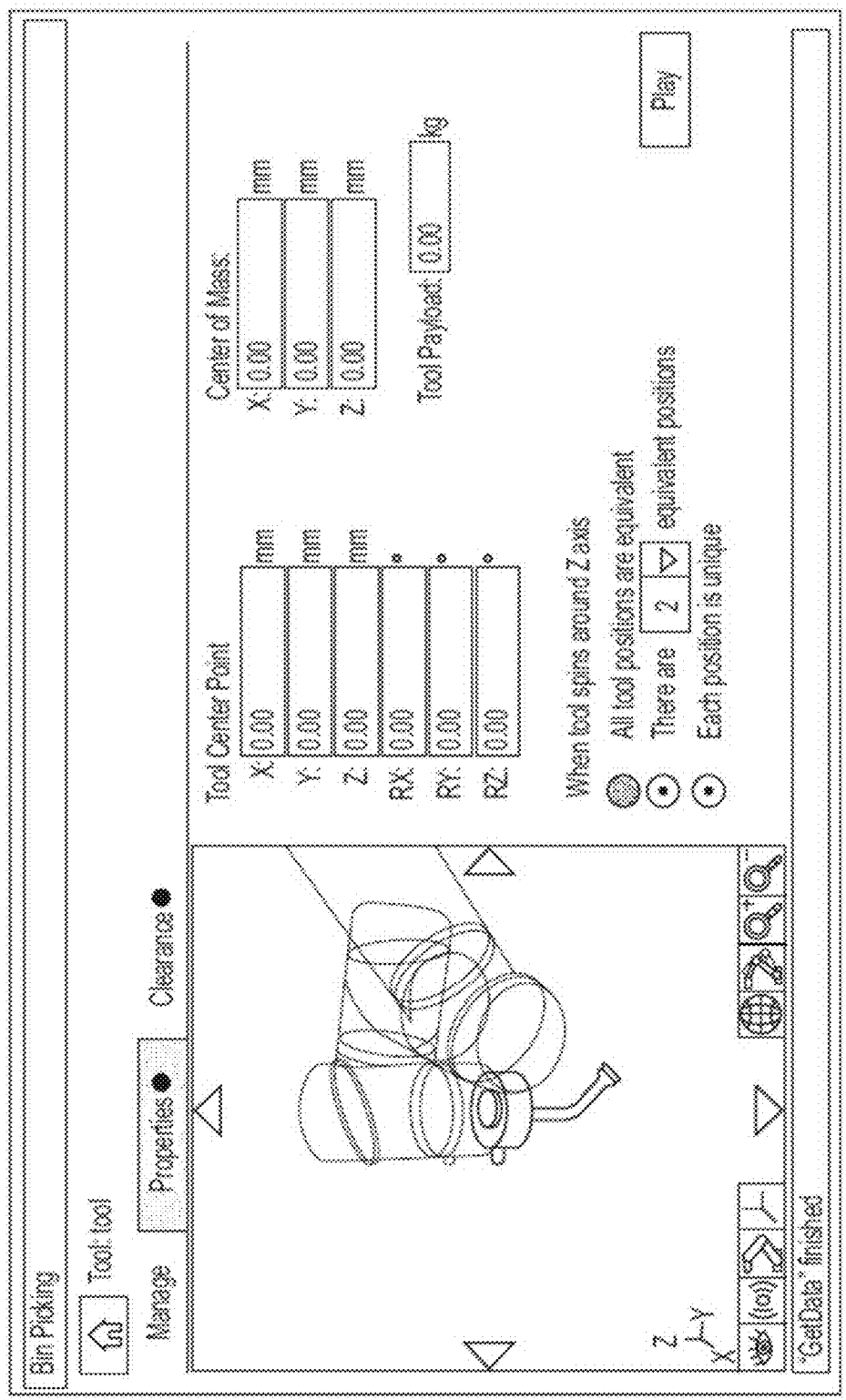
FIG. 42 is a graphical user interface of a robotic system, according to an embodiment of the present disclosure.

Referring now to FIG. 42, an embodiment showing an example graphical user interface 4200 consistent with the present disclosure is provided. GUI 4200 may be configured to display an installation tabs changes end effector. In operation, the play option may be configured to demonstrate selected rotation in the viewer by animating the spinning of the end effector or the workpiece. Selecting any field (other than the viewer itself) or exiting the page may take the viewer out of the play mode. In some embodiments, the dropdown menu may allow the user to select the type of end effector symmetry (e.g., each position is unique, all positions are equivalent, there are 2/3/4 equivalent positions, etc.). The "play" option displayed in FIG. 42, and in other embodiments, when selected, may demonstrate selected rotation in the viewer by animating spinning of the end effector or the workpiece. Selecting any field (other than the viewer itself) or exiting the page may take the viewer out of the play mode. FIG. 42 only shows specification of end effector symmetry. It is understood that a similar set of controls may be used to specify symmetry around other axes.

Figure 43:
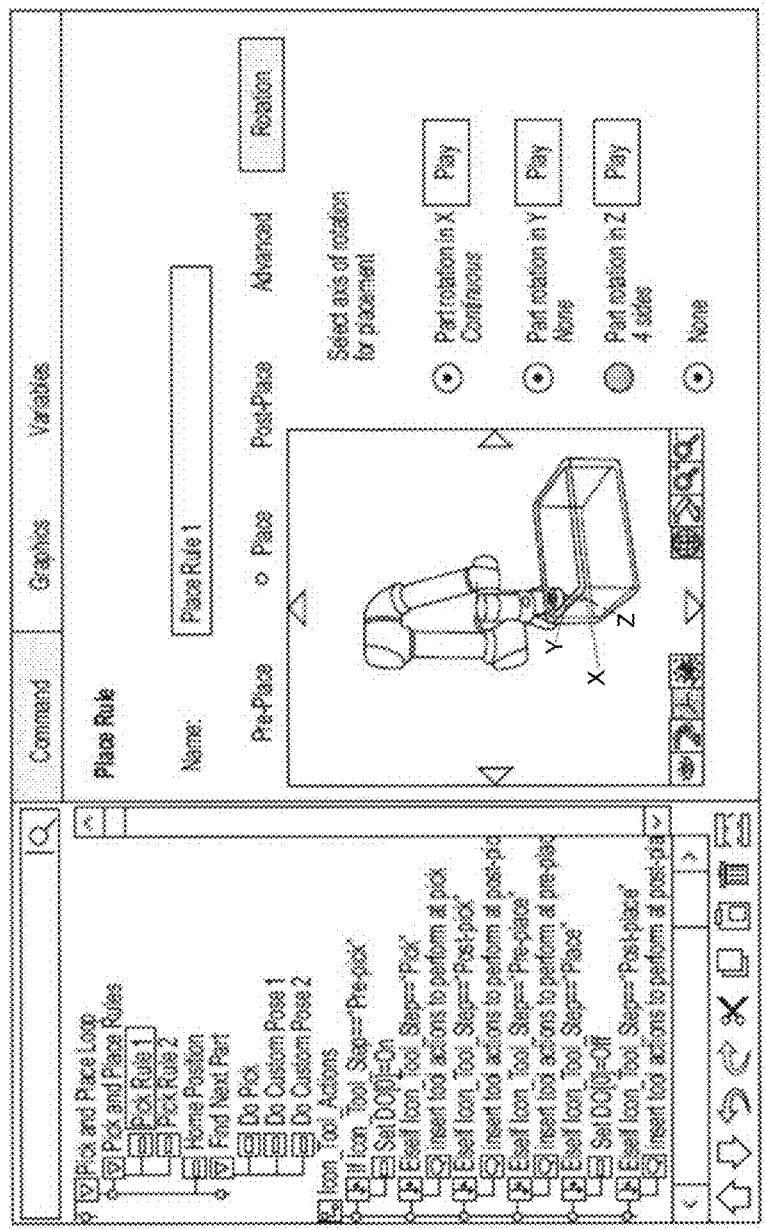
FIG. 43 is a graphical user interface of a robotic system, according to an embodiment of the present disclosure.

Referring now to FIG. 43, an embodiment showing an example graphical user interface 4300 consistent with the present disclosure is provided. GUI 4300 may display a place rule rotation tab that may be configured to allow a user to visualize one or more place optimizations derived from workpiece symmetry in one of the workpiece axes.

In some embodiments, the graphical user interfaces of the present disclosure may allow for workpiece and end effector symmetries to be defined using various user-editable options such as the installation tab described above. Accordingly, there is no need to edit symmetries in pick/place rules pages. Ease of use may be achieved through the visualization of symmetries in the viewer and in some embodiments the viewer display end effector rotation. In some embodiments it may not be necessary to explicitly define zero reference axis for rotational symmetry as a zero reference may be defined implicitly by pick and place rules.

In some embodiments, and as discussed above, the present disclosure may provide a method for specifying the allowable range of poses of a robot and/or robot end effector for the purpose of picking up a workpiece. The method may include graphically displaying the robot and/or robot end effector, the workpiece, and/or the axes of the workpiece coordinate frame. The method may also include querying a user whether the end effector has substantially equivalent performance for picking up the workpiece when the end effector is rotated around one or more axes of its coordinate frame.

In some embodiments, when the end effector is rotated around one or more axes of its coordinate frame, it may be determined that the end effector has substantially equivalent performance for picking up the workpiece. In this situation, the user may be allowed to specify each rotation as continuous, or in a number of discrete steps. In some cases, the specified rotation may be displayed as a series of images. For example, at a graphical display such as those described above (e.g., on a robot teach pendant, or any other suitable device).

In some embodiments, the present disclosure may provide a method for specifying the allowable range of poses of a workpiece feature for the purpose of being contacted by a robot and/or robot end effector. The method may include graphically displaying the workpiece, the axes of its coordinate frame, and/or the robot or the robot end effector, where the robot and/or robot end effector may be displayed in a pose for contacting the workpiece. The method may further include querying a user as to whether the end effector has substantially equivalent performance for contacting the workpiece when the workpiece is rotated around one or more axes in its coordinate frame.

In some embodiments, when the workpiece is rotated around one or more axes of its coordinate frame, the robot and/or robot end effector may have substantially equivalent performance for contacting the workpiece. Accordingly, the user may specify each rotation as continuous, or in a number of discrete steps.

In some embodiments, the present disclosure may provide a method for specifying the allowable range of poses of a workpiece for the purpose of placing it at a workpiece placement target. The method may include graphically displaying the workpiece, the axes of its coordinate frame, and/or the workpiece placement target. In some embodiments, the workpiece may be displayed in a pose for placing the workpiece at the workpiece placement target. The method may include querying a user as to whether the workpiece may be placed correctly when the workpiece is rotated around one or more axes in its coordinate frame.

In some embodiments, the present disclosure may provide a method for specifying the allowable range of poses of a robot and/or robot end effector for the purpose of placing a workpiece at a workpiece placement target, where the allowable range of poses being relative to the workpiece placement target. The method may include graphically displaying the robot and/or robot end effector, the workpiece, the axes of the workpiece coordinate frame, and/or the workpiece placement target. In some embodiments the robot and/or robot end effector may be displayed in a pose for placing a workpiece at the workpiece placement target. The method may include querying a user as to whether it may be possible to place the workpiece at the workpiece placement target correctly when the workpiece is rotated around one or more axes in its coordinate frame.

In some embodiments, when the workpiece is rotated around one or more axes in its coordinate frame, the workpiece may have at least one correct placement at the placement target. In this situation, the user may specify each rotation as continuous, or in a number of discrete steps. If the workpiece is rotated around one or more axes in its coordinate frame, and the workpiece has at least one correct placement at the placement target, the user may specify each rotation as a smaller angle than a complete rotation. In some cases, the range of possible rotations may be displayed as a series of images (e.g., at a graphical display associated with a robot teach pendant).

In some embodiments, the present disclosure may provide a method for calculating the greatest range of possible poses of a workpiece feature and of a robot and/or robot end effector, each relative to the other, for contacting the workpiece feature with the robot end effector. The method may include determining a first set of the allowable range of poses for the workpiece feature, where each of the allowable poses results in substantially equivalent performance for contacting the workpiece feature with a robot and/or robot end effector. The method may include determining a second set of the allowable range of poses for the robot and/or robot end effector, where each of the allowable poses results in substantially equivalent performance for contacting the workpiece feature with a robot and/or robot end effector. The method may also include selecting either the first set or the second set. This may be determined based upon which set allows the greatest range of poses with substantially equivalent performance for contacting the workpiece feature with the robot and/or robot end effector.

In some embodiments, the present disclosure may provide a method for calculating the greatest range of poses of a workpiece and of a workpiece placement target, each relative to the other, for placing the workpiece at a workpiece placement target. The method may include determining a first set of the allowable range of poses for the workpiece, where each of the allowable poses may result in substantially equivalent performance for placing the workpiece at the workpiece placement target. The method may further include determining a second set of the allowable range of poses for the workpiece placement target, where each of the allowable poses may result in substantially equivalent performance for placing the workpiece at the workpiece placement target. The method may also include selecting either the first set or the second set, determined by which set may allow for the greatest range of poses with substantially equivalent performance for placing the workpiece at a workpiece placement target.

In some embodiments, the present disclosure may provide a method for specifying the allowable range of poses of a robot end effector relative to a workpiece, for the purpose of contacting the workpiece to transport the workpiece with the robot end effector. The method may include graphically displaying the workpiece, the robot and/or the robot end effector, and/or the axes of the workpiece coordinate frame, where the robot end effector may be displayed in a pose for contacting the workpiece. The user may be allowed to specify the magnitude of an end effector translation along each axis of the workpiece coordinate frame for which the contact between the robot end effector and the workpiece has acceptable performance for the purpose of contacting the workpiece to transport the workpiece with the robot end effector. In some cases, the specified translation along each axis may be displayed as a series of images (e.g., at a graphical display associated with a robot teach pendant).

In some embodiments, the present disclosure may provide a method for specifying an allowable range of poses of a robot end effector relative to a workpiece, for the purpose of contacting a workpiece to transport the workpiece with the robot end effector. The method may include graphically displaying the workpiece, the robot end effector, and the axes of the robot end effector coordinate frame, where the robot and/or robot end effector may be displayed in a pose for contacting the workpiece. In some cases the user may be allowed to specify the magnitude of an end effector rotation around the origin of the robot end effector coordinate frame, relative to one or more axes of the robot end effector coordinate frame, for which the contact between the robot end effector and the workpiece has acceptable performance for the purpose of contacting the workpiece to transport the workpiece with the robot end effector. In some cases, one of the axes of the robot end effector coordinate frame may be normal to a contact point at the surface of the workpiece. In some cases, the specified rotation relative to each axis may be displayed as a series of images (e.g., at a graphical display associated with a robot teach pendant).

In some embodiments, the present disclosure may provide a method for specifying the allowable range of poses of a robot end effector for the purpose of picking up a workpiece. The method may include determining the degree of symmetry of the pick feature on the workpiece. The degree of symmetry may be continuous, discrete, and/or asymmetrical, for rotation of the workpiece around each of the axes of the workpiece's coordinate frame. If the determined symmetry is discrete, the method may include determining the increment of the discrete rotation around the corresponding axis. The method may also include determining the degree of symmetry of the robot end effector, where the degree of symmetry may be continuous, discrete, and/or asymmetrical, for rotation of the robot end effector around each of the axes of the robot end effector's coordinate frame. If the determined symmetry is discrete, the method may include determining the increment of the discrete rotation around the corresponding axis. The method may also include determining a first valid pose for the workpiece relative to the robot end effector for the purpose of picking up the workpiece. For an axis of workpiece's coordinate frame that is coincident with an axis of the robot end effector's coordinate frame when the workpiece is in the first valid pose, the method may include determining a range of valid robot end effector poses by allowing rotation of the end effector according to the degree of symmetry determined for either the workpiece around the an axis of the workpiece's coordinate frame or for the robot end effector around the an axis of the robot end effector's coordinate frame.

In some embodiments, the present disclosure may provide a method for specifying the allowable range of poses of a workpiece for the purpose of placing the workpiece at a placement target. The method may include determining the degree of symmetry of the place feature on the workpiece, where the degree of symmetry may be continuous, discrete, or asymmetrical, for rotation of the workpiece around each of the axes of the workpiece's coordinate frame, and where, if the determined symmetry is discrete, determining the increment of the discrete rotation around the corresponding axis. The method may also include determining the degree of symmetry of the placement target, where the degree of symmetry may be continuous, discrete, or asymmetrical, for rotation of the placement target around each of the axes of the place target's coordinate frame, and where, if the determined symmetry is discrete, determining the increment of the discrete rotation around the corresponding axis. The method may further include determining a first valid pose for the workpiece relative to the placement target for the purpose of placing the workpiece. For an axis of workpiece's coordinate frame that may be coincident with an axis of the placement target's coordinate frame when the workpiece is in the first valid pose, the method may include determining a range of valid workpiece poses by allowing rotation of the workpiece according to the degree of symmetry determined for either the workpiece around the an axis of the workpiece's coordinate frame or for the placement target around the an axis of the placement target's coordinate frame.

In some embodiments, the present disclosure may provide a system for picking up and placing workpieces. The system may include one or more of a robot, a robot end effector, a sensor, a robot controller, and/or a robot teach pendant in communication with the robot controller. In some embodiments, the sensor may be configured to detect the poses of one or more workpieces relative to the robot, and the robot controller may be configured to select a workpiece as detected by the sensor. The robot controller may be further configured to select from a range of possible end effector picking poses for the purpose of picking up the workpiece. The robot controller may be further configured to select from a range of possible end effector placing poses for the purpose of placing the workpiece at a workpiece placement target. The robot controller may be further configured to prompt a user for information concerning the symmetry of the end effector in order to generate the range of possible end effector picking poses. The user may be prompted for information concerning the symmetry of the end effector using a graphical user interface (e.g., on the robot teach pendant). The robot controller may be further configured to prompt a user for information concerning the symmetry of the workpiece pick features in order to generate the range of possible end effector picking poses. The user may be prompted for information concerning the symmetry of the end effector on the robot teach pendant. The robot controller may be further configured to select from a range of possible end effector placement poses for the purpose of placing the workpiece at a workpiece placement target.

In some embodiments, the robot controller may be further configured to prompt a user for information concerning the symmetry of the workpiece place features in order to generate the range of possible end effector placement poses. The user may be prompted for information concerning the symmetry of the end effector on the robot teach pendant. The robot controller may be further configured to prompt a user for information concerning the symmetry of the workpiece place target in order to generate the range of possible end effector placement poses. The user may be prompted for information concerning the symmetry of the end effector on the robot teach pendant. The robot controller may be further configured to calculate a path from a selected end effector picking pose to a selected end effector placing pose. The path between the selected end effector picking pose and the selected end effector placing pose may be optimized for the highest probability of a successful workpiece pick and a successful workpiece placement.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may, but not always, represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

A number of implementations of the invention have been described. Nevertheless, it will be understood that various modifications may be made without departing from the spirit and scope of the invention.

For example, in some implementations, the robot may be any mechanical system configured to pick up at least one object and move it from one place to another.

In some implementations, the graphical user interface may be implemented in places other than a robot teach pendant, including but not limited to a computer display, a mobile device, or a tablet computer. Moreover, while in some implementations "a processor" may be used, it should be noted that this may include, but is not limited to, a processor associated with or separate from a robot controller, for example, a single processor separate from or included within the controller, a plurality of processors separate from or included within the controller, etc. In some cases, one processor located in one device may perform certain operations and another processor located in a physically separate area may perform other operations. Additionally and/or alternatively, some or all of the operations may be performed by a processor or group of processors located in a single device, such as those associated with the robotic systems included herein.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A robotic system comprising:
    a robot configured to receive an initial constrained approach for performing a robot task, wherein the initial constrained approach is based upon, at least in part, a demonstration that shows the robotic system how to perform the robot task;
    a graphical user interface in communication with the robot, the graphical user interface configured to allow a user to interact with the robot to determine an allowable range of robot poses associated with the robot task, wherein the allowable range of robot poses is larger than the initial constrained approach and allows for a relaxation of the initial constrained approach, and wherein the allowable range of poses is based upon, at least in part, one or more degrees of symmetry associated with at least one of a workpiece associated with the robot task or an end effector associated with the robot; and
    a processor configured to communicate the allowable range of robot poses to the robot.

2. The system of claim 1, wherein the initial constrained approach for performing the robot task is received from at least one of a user input, a program, a simulation, or a user demonstration.

3. The system of claim 1, wherein the one or more degrees of symmetry includes a degree of symmetry of a pick feature of a workpiece associated with the robot task.

4. The system of claim 3, wherein the degree of symmetry of the pick feature of the workpiece is continuous, discrete, or asymmetrical.

5. The system of claim 1, wherein the one or more degrees of symmetry includes a degree of symmetry of the robot end effector.

6. The system of claim 5, wherein the degree of symmetry of the robot end effector is continuous, discrete, or asymmetrical.

7. The system of claim 1, wherein the one or more degrees of symmetry includes a degree of symmetry of a placement target associated with the robot task.

8. The system of claim 7, wherein the degree of symmetry of the placement target is continuous, discrete, or asymmetrical.

9. The system of claim 1, wherein the processor is further configured to determine a first valid pose for a workpiece relative to the robot end effector associated with the robot.

10. The system of claim 9, wherein the processor is further configured to identify an axis of a coordinate frame associated with the workpiece that is coincident with an axis of the robot end effector's coordinate frame when the workpiece is in the first valid pose.

11. The system of claim 9, wherein the processor is further configured to determine a range of valid robot end effector poses by allowing rotation of the robot end effector based upon, at least in part, a degree of symmetry determined for either the workpiece around the axis of the workpiece's coordinate frame or for the robot end effector around the axis of the robot end effector's coordinate frame.

12. The system of claim 11, wherein the graphical user interface is configured to display the robot end effector, a workpiece, and at least one of an axis of a coordinate frame associated with the robot end effector or an axis of a coordinate frame associated with the workpiece and wherein the graphical user interface is configured to allow a user to specify whether the robot end effector has substantially equivalent performance for picking up a workpiece when the robot end effector is rotated around the axis of the coordinate frame associated with the robot end effector or the axis of the coordinate frame associated with the workpiece.

13. The system of claim 1, wherein the processor is further configured to determine a placement for a workpiece relative to a placement target associated with the robotic system.

14. The system of claim 13, wherein the processor is further configured to determine a range of valid robot end effector poses by allowing rotation of the robot end effector based upon, at least in part, a degree of symmetry determined for either the workpiece around the axis of the workpiece's coordinate frame or for the placement target.

15. The system of claim 14, wherein the graphical user interface is configured to display the robot end effector, a workpiece, and at least one of an axis of a coordinate frame associated with the robot end effector or an axis of a coordinate frame associated with the workpiece and wherein the graphical user interface is configured to allow a user to specify whether the robot end effector has substantially equivalent performance for placing the workpiece at the placement target when the robot end effector is rotated around the axis of the coordinate frame associated with the robot end effector or the axis of the coordinate frame associated with the workpiece.

16. The system of claim 1, wherein the processor is further configured to determine a minimum number of degrees of freedom (DOFs) required for the robot to perform the task associated with the range of poses, the processor being further configured to determine an additional number of degrees of freedom required to satisfy one or more additional constraints.

17. The system of claim 16, wherein the processor is further configured to combine the minimum number of degrees of freedom with the additional number of degrees of freedom to determine a total number of degrees of freedom, wherein the processor is further configured to compare the total number of degrees of freedom with a maximum number of allowable degrees of freedom associated with the robot.

18. The system of claim 17, wherein the processor is further configured to determine a difference between the maximum number of allowable degrees of freedom and the total number of degrees of freedom and to optimize performance of the robot, based upon, at least in part, a range of poses associated with the difference.

19. The system of claim 1, wherein the allowable range of poses is based upon, at least in part, one or more degrees of symmetry associated with a placement target associated with the robot task.

20. A robotic method comprising:
providing a robot configured to receive an initial constrained approach for performing a robot task, wherein the initial constrained approach is based upon, at least in part, a demonstration that shows the robotic system how to perform the robot task;
allowing a user to interact with the robot using a graphical user interface in communication with the robot, the graphical user interface configured to allow a user to interact with the robot to determine an allowable range of robot poses associated with the robot task, wherein the allowable range of robot poses is larger than the initial constrained approach and allows for a relaxation of the initial constrained approach, and wherein the allowable range of poses is based upon, at least in part, one or more degrees of symmetry associated with at least one of a workpiece associated with the robot task, a placement target associated with the robot task, or an end effector associated with the robot; and
communicating, via a processor, the allowable range of robot poses to the robot.

21. The system of claim 1, wherein the allowable range of robot poses is based upon one or more of workpiece constraints, environmental constraints and manipulator constraints.

22. The system of claim 1, wherein the one or more degrees of symmetry relates to whether the at least one of the workpiece associated with the robot task or the end effector associated with the robot has identical performance for its intended picking or placing operation, when rotated around one or more of three axes of its coordinate frame.

* * * * *